United States Patent
DeHon et al.

(10) Patent No.: US 12,019,736 B2
(45) Date of Patent: Jun. 25, 2024

(54) METHODS, SYSTEMS, AND COMPUTER READABLE MEDIA FOR MAIN MEMORY TAG COMPRESSION

(71) Applicant: The Trustees of the University of Pennsylvania, Philadelphia, PA (US)

(72) Inventors: Andre Maurice DeHon, Philadelphia, PA (US); Nicholas Edward Roessler, Philadelphia, PA (US)

(73) Assignee: THE TRUSTEES OF THE UNIVERSITY OF PENNSYLVANIA, Philadelphia, PA (US)

( * ) Notice: Subject to any disclaimer, the term of this patent is extended or adjusted under 35 U.S.C. 154(b) by 79 days.

(21) Appl. No.: 17/188,547

(22) Filed: Mar. 1, 2021

(65) Prior Publication Data

US 2022/0121738 A1 Apr. 21, 2022

Related U.S. Application Data

(60) Provisional application No. 62/982,550, filed on Feb. 27, 2020.

(51) Int. Cl.
*G06F 21/54* (2013.01)
*G06F 21/55* (2013.01)
*G06F 21/79* (2013.01)

(52) U.S. Cl.
CPC ............ *G06F 21/54* (2013.01); *G06F 21/554* (2013.01); *G06F 21/79* (2013.01)

(58) Field of Classification Search
CPC ....... G06F 21/54; G06F 21/554; G06F 21/799
See application file for complete search history.

(56) References Cited

U.S. PATENT DOCUMENTS

| | | |
|---|---|---|
| 9,183,320 B2 | 11/2015 | Ono et al. |
| 9,785,440 B2 | 10/2017 | DeHon |
| 10,078,763 B2 | 9/2018 | Chiricescu et al. |

(Continued)

FOREIGN PATENT DOCUMENTS

WO WO-2017106101 A2 * 6/2017 ......... G06F 12/0875

OTHER PUBLICATIONS

Nick Roessler • Andre DeHon; Protecting the Stack with Metadata Policies and Tagged Hardware; 2018 IEEE Symposium on Security and Privacy (SP) (pp. 478-495); (Year: 2018).*

(Continued)

*Primary Examiner* — Luu T Pham
*Assistant Examiner* — Chao Wang
(74) *Attorney, Agent, or Firm* — Jenkins, Taylor & Hunt, P.A.

(57) ABSTRACT

Methods, systems, and computer readable media for using metadata tag compression. A method occurs at a metadata processing system for enforcing security policies in a processor architecture. The method comprises: receiving, at the metadata processing system, a short tag associated with a word in memory; translating the short tag, using a tag map, into a long tag, wherein the short tag indicates a location of the long tag relative to an offset in the tag map and wherein the long tag indicates a memory location containing metadata associated with the word or an instruction; obtaining the metadata from the memory location; and determining, using the metadata, whether the word or the instruction violates a security policy.

16 Claims, 17 Drawing Sheets

(56) References Cited

U.S. PATENT DOCUMENTS

| | | | |
|---|---|---|---|
| 10,235,176 | B2 | 3/2019 | DeHon et al. |
| 10,261,794 | B2 | 4/2019 | DeHon |
| 10,521,230 | B2 | 12/2019 | DeHon |
| 10,545,760 | B2 | 1/2020 | DeHon |
| 10,642,616 | B2 | 5/2020 | DeHon et al. |
| 10,719,630 | B2 | 7/2020 | Chiricescu et al. |
| 10,725,778 | B2 | 7/2020 | DeHon et al. |
| 11,232,208 | B2 | 1/2022 | DeHon et al. |
| 2014/0040698 | A1 | 2/2014 | Loh et al. |
| 2014/0281550 | A1 | 9/2014 | Resch |
| 2018/0336033 | A1 | 11/2018 | DeHon et al. |
| 2019/0034665 | A1 | 1/2019 | Chiricescu et al. |
| 2019/0243655 | A1 | 8/2019 | Milburn et al. |
| 2020/0050703 | A1 | 2/2020 | Purushothaman et al. |
| 2020/0089500 | A1 | 3/2020 | DeHon |
| 2020/0133544 | A1 | 4/2020 | Slater et al. |
| 2020/0174966 | A1 | 6/2020 | Szczepanik et al. |
| 2020/0201789 | A1* | 6/2020 | Durham ................ G06F 21/602 |
| 2020/0272736 | A1 | 8/2020 | DeHon et al. |
| 2020/0387374 | A1 | 12/2020 | DeHon |
| 2021/0004231 | A1 | 1/2021 | DeHon |
| 2021/0026934 | A1 | 1/2021 | Boling et al. |
| 2021/0055954 | A1 | 2/2021 | Milburn et al. |
| 2021/0073375 | A1 | 3/2021 | Milburn et al. |
| 2021/0203504 | A1* | 7/2021 | Brandt .................. H04L 9/3226 |
| 2022/0012329 | A1* | 1/2022 | Boling .................. G06F 21/577 |
| 2023/0281319 | A1 | 9/2023 | DeHon et al. |

OTHER PUBLICATIONS

H. Kannan; Ordering decoupled metadata accesses in multiprocessors; 2009 42nd Annual IEEE/ACM International Symposium on Microarchitecture (MICRO) (pp. 381-390); (Year: 2009).*

Stipic, S. • Tomic, S. • Zyulkyarov, F. • Cristal, A. • Unsal, O. • Valero, M.; TagTM—accelerating STMs with hardware tags for fast meta-data access; 2012 Design, Automation & Test in Europe Conference & Exhibition (DATE) (pp. 39-44); (Year: 2012).*

Notice of Allowance and Fee(s) Due for U.S. Appl. No. 16/802,216 (dated Aug. 9, 2021).

Sullivan et al., "The Dover Inherently Secure Processor," IEEE, pp. 1-5 (2017).

Prakash, "The Holy Grail—Real Time Memory Access Checking," Oracle All in a day's work Blog, pp. 1-5 (Oct. 15, 2015).

Heo et al., "Implementing an Application-Specific Instruction-Set Processor for System-Level Dynamic Program Analysis Engines," ACM Transactions on Design Automation of Electronic Systems, vol. 20, No. 4, Article 53, pp. 1-32 (Sep. 2015).

Dhawan et al., "Architectural Support for Software-Defined Metadata Processing," ASPLOS 2015, pp. 487-502 (Mar. 14-18, 2015).

Davi et al., "Stitching the Gadgets: On the Ineffectiveness of Coarse-Grained Control-Flow Integrity Protection," Proceedings of the 23rd USENIX Security Symposium, pp. 1-17 (Aug. 20-22, 2014).

Fytraki et al., "FADE: A Programmable Filtering Accelerator for Instruction-Grain Monitoring," In Proceedings of the 20th International Symposium on High Performance Computer Architecture (HPCA 2014), pp. 1-12 (2014).

Gökta et al., "Out Of Control: Overcoming Control-Flow Integrity," IEEE Symposium on Security and Privacy, pp. 1-15 (2014).

Nagarakatte et al., "Hardware-Enforced Comprehensive Memory Safety," IEEE Computer Society, pp. 38-47 (2013).

Zhang et al., "Practical Control Flow Integrity & Randomization for Binary Executables," 2013 IEEE Symposium on Security and Privacy, pp. 559-573 (2013).

Chen et al., "A Software-Hardware Architecture for Self-Protecting Data," CCS '12, pp. 1-14 (Oct. 16-18, 2012).

Ganesh, "Pointer Checker: Easily Catch Out-of-Bounds Memory Accesses," The Parallel Universe, pp. 1-16 (2012).

Kang et al., "DTA++: Dynamic Taint Analysis with Targeted Control-Flow Propagation," Network and Distributed System Security Symposium (NDSS), pp. 1-14 (2011).

Abadi et al., "Control-Flow Integrity Principles, Implementations, and Applications," ACM Transactions on Information and System Security, vol. 13, No. 1, Article 4, pp. 1-40 (Oct. 2009).

Akritidis et al., "Baggy Bounds Checking: An Efficient and Backwards-Compatible Defense against Out-of_Bounds Errors," Proceedings of the 18th Conference on USENIX Security Symposium, pp. 1-16 (2009).

Nagarakatte et al., "SoftBound: Highly Compatible and Complete Spatial Memory Safety for C," PLDI '09, pp. 245-258 (Jun. 15-20, 2009).

Chen et al., "Flexible Hardware Acceleration for Instruction-Grain Program Monitoring," 35th International Symposium on Computer Architecture (ISCA), pp. 1-12 (2008).

Clause et al., "Effective Memory Protection Using Dynamic Tainting," ASE'07, pp. 283-292 (Nov. 5-9, 2007).

Clause et al., "Dytan: A Generic Dynamic Taint Analysis Framework," ISSTA '07, pp. 1-11 (Jul. 9-12, 2007).

Arora et al., "Architectural Support for Run-Time Validation of Program Data Properties," IEEE Transactions on Very Large Scale Integration (VLSI) Systems, vol. 15, pp. 546-559 (May 2007).

Venkataramani et al., "MemTracker: Efficient and Programmable Support for Memory Access Monitoring and Debugging," Proceedings of the 13th International Symposium on High-Performance Computer Architecture *HPCA-13), pp. 1-12 (Feb. 2007).

Crandall et al., "Minos: Architectural Support for Protecting Control Data," ACM Transactions on Architecture and Code Optimization, vol. 3, No. 4, pp. 359-389 (Dec. 2006).

Abadi et al., "Control-Flow Integrity," CCS'05, pp. 340-353 (Nov. 7-11, 2005).

Chen et al., "Defeating Memory Corruption Attacks via Pointer Taintedness Detection," International Conference on Dependable Systems and Networks (DSN), pp. 1-10 (2005).

Suh et al., "Secure Program Execution via Dynamic Information Flow Tracking," ASPLOS '04, pp. 85-96 (Oct. 9-13, 2004).

Vachharajani et al., "RIFLE: An Architectural Framework for User-Centric Information-Flow Security," Proceedings of the 37th International Symposium on Microarchitecture, pp. 1-12 (2004).

Carter et al., "Hardware Support for Fast Capability-based Addressing," Association of Computing Machinery, pp. 319-327 (1994).

Wahbe et al., "Efficient Software-Based Fault Isolation," Proceedings of the Symposium on Operating System Principles, pp. 1-14 (1993).

Huffman, "A Method for the Construction of Minimum-Redundancy Codes," Proceedings of the I.R.E., pp. 1098-1101 (Sep. 1952).

Notice of Allowance and Fee(s) Due for U.S. Appl. No. 16/802,216 (dated Sep. 2, 2021).

Introduction to SPARC M7 and Application Data Integrity (ADI). https://swisdev.oracle.com/_files/What-Is-ADI.html. Accessed: Dec. 9, 2019.

Roessler, "Policy Implementation and Engineering for Tagged Architectures", Publicly Accessible Penn Dissertaions 4228, pp. 1-144 (2021).

Roessler and DeHon, "SCALPEL: Exploring the Limits of Tag-enforced Compartmentalization", ACM Journal on Emerging Technologies in Computing Systems, vol. 18, No. 1, Article 2, pp. 1-28 (Sep. 2021).

AppArmor. https://wiki.ubuntu.com/AppArmor. Accessed: Sep. 11, 2020.

HTTP Web Server Example. https://freertos.org/FreeRTOS-Plus/FreeRTOS_Plus_TCP/HTTP_web_Server.html. Accessed: Sep. 30, 2020.

CVE Details: Libxml2 Vulnerability Statistics. https://www.cvedetails.com/product/3311/Xmlsoft-Libxml2.html?vendor_id=1962. Accessed: Oct. 25, 2020.

The MONDIAL Database. https://www.dbis.informatik.uni-goettingen.de/Mondial. 2020.

The XML C Parser and toolkit of Gnome. http://www.xmlsoft.org/. Accessed: Oct. 4, 2020.

NXP Selects Dover Microsystems' State-of-the-Art CoreGuard Cybersecurity Technology for Future Embedded Platforms. https://media.nxp.com/news-releases/news-release-details/nxp-selects-dover-microsystems-state-art-corequard-cybersecurity (2018).

(56) References Cited

OTHER PUBLICATIONS

Abbasi, et al., "Challenges in Designing Exploit Mitigations for Deeply Embedded Systems", IEEE European Symposium on Security and Privacy (EuroS&P), pp. 1-16 (2019).
Daniel Aloise, et al., "NP-hardness of Euclidean sum-of-squares clustering", Machine Learning 75, 2, pp. 245-248 (May 1, 2009).
ARM TrustZone Technology for ARM v8-M Architecture, ARM, pp. 1-26 (2016).
ARMv8-M Architecture Reference Manual. ARM Limited. 2016.
Arthur Azevedo de Amorim, et al, "Micro-Policies: Formally Verified, Tag-Based Security Monitors", In 36th IEEE Symposium on Security and Privacy (Oakland S&P). IEEE Computer Society, 813-830 (2015). https://doi.org/10.1109/SP.2015.55.
Arthur Azevedo de Amorim. "A methodology for micro-policies", A Dissertation in Computer and Information Science. University of Pennsylvania, (2017).
Bittau, et al., "Wedge: Splitting Applications into Reduced-Privilege Compartments" In Proceedings of the 5th USENIX Symposium on Networked Systems Design and Implementation (NSDI'08). Usenix Association, Berkeley, CA, USA, 309-322 (2008).
Shimin Chen, et al., "Flexible Hardware Acceleration for Instruction-Grain Program Monitoring", In 35th International Symposium on Computer Architecture (ISCA). IEEE, pp. 377-388 (2008).
Clements, et al., "ACES: Automatic Compartments for Embedded Systems", In 27th USENIX Security Symposium (USENIX Security 2018). USENIX Association, pp. 65-82 (2018).
DARPA. [n.d.]. Transparent Computing. https://www.darpa.mil/program/transparent-computing. Accessed: Sep. 30, 2020.
Daniel Y. Deng and G. Edward Suh, "High-performance parallel accelerator for flexible and efficient run-time monitoring" In IEEE/IFIP International Conference on Dependable Systems and Networks (DSN). IEEE Computer Society, 1-12 (2012). http://tsg.ece.cornell.edu/lib/exe/fetch.php?media=pubs:flex-dsn2012.pdf.
Udit Dhawan and André DeHon., "Area-Efficient Near-Associative Memories on FPGAs", In Proceedings of the International Symposium on Field-Programmable Gate Arrays, pp. 191-200 (2013).
Dhawan, et al., "Architectural Support for Software-Defined Metadata Processing", In International Conference on Architectural Support for Programming Languages and Operating Systems, pp. 487-502 (2015).
Dong, et al., "A quantitative evaluation of privilege separation in web browser designs", In European Symposium on Research in Computer Security. Springer, pp. 75-93 (2013).
Dovecot. [n.d.]. Dovecot Mail Server.https://github.com/dovecot/core. Accessed: Oct. 12, 2020.
Kevin Elphinstone and Gernot Heiser, "From L3 to seL4 What Have We Learnt in 20 Years of L4 Microkernels?" In Proceedings of the ACM Symposium on Operating Systems Principles (Farminton, Pennsylvania) (SOSP '13). ACM, New York, NY, USA, pp. 133-150 (2013).
Joseph A Fisher and Stefan M Freudenberger, "Predicting conditional branch directions from previous runs of a program" ACM SIGPLAN Notices 27, 9, pp. 85-95 (1992).
Sotiria Fytraki, et al., "FADE: A programmable filtering accelerator for instruction-grain monitoring", In 20th IEEE International Symposium on High Performance Computer Architecture, HPCA 2014, Orlando, FL, USA, Feb. 15-19, pp. 1-12 (2014).
Khilan Gudka, et al., "Clean Application Compartmentalization with SOAAP", In Proceedings of the 22Nd ACM SIGSAC Conference on Computer and Communications Security (CCS '15). ACM, New York, NY, USA, pp. 1016-1031 (2015).
HEX-Five [n.d.]. MultiZone Security Reference Manual. HEXFive. 2020.
Hsu, et al., "Enforcing Least Privilege Memory Views for Multithreaded Applications", In ACM Conf on Computer and Communication Security, pp. 1-13 (2016).
Kim, et al., "Securing Real-Time Microcontroller Systems through Customized Memory View Switching", In NDSS, pp. 1-15 (2018).
Draper Laboratory. [n.d.]. Hope-tools Github Repository. https://github.com/draperlaboratory/hope-src. Accessed: Oct. 5, 2020.
Jochen Liedtke. "On micro-Kernel Construction", In 15th ACM Symposium on Operating Systems Principles, pp. 237-250 (1995).
Arm Limited. [n.d.]. Arm Cortex-A53 Specification. https://developer.arm.com/ip-products/processors/cortexa/cortex-a53. Accessed: Oct. 5, 2020.
Liu, et al., "Program-mandering: Quantitative Privilege Separation" In Proceedings of the 2019 ACM SIGSAC Conference on Computer and Communications Security (London, UK) (CCS '19). ACM, pp. 1023-1040 (2019).
Mittal, "A survey of recent prefetching techniques for processor cache", ACM Computing Surveys (CSUR) 49, 2, pp. 1-35 (2016).
Gabriel Parmer and Richard West. 2012. Mutable protection domains: Adapting system fault isolation for reliability and efficiency. IEEE Transactions on Software Engineering 38, 4 (2011), 875-888.
Pomonis, et al., "kR^X: Comprehensive Kernel Protection against Just-In-Time Code Reuse", In Proc. of EuroSys, pp. 1-17 (2017).
Richard F. Rashid and George G. Robertson, "Accent: A Communication Oriented Network Operating System Kernel" In Proceedings of the Eighth ACM Symposium on Operating Systems Principles (Pacific Grove, California, USA) (SOSP '81). ACM, New York, NY, USA, pp. 64-75 (1981).
Nick Roessler and André DeHon., "Protecting the Stack with Metadata Policies and Tagged Hardware" In IEEE Symposium on Security and Privacy (Oakland S&P). IEEE Computer Society, pp. 478-495 (2018).
Jerry H. Saltzer and Mike D. Schroeder, "The Protection of Information in Computer Systems" Proc. IEEE 63, 9, pp. 1278-1308 (1975).
Andreas Sembrant, "Efficient techniques for detecting and exploiting runtime phases", Ph.D. Dissertation. Uppsala University, pp. 1-225 (2012).
Sherwood, et al., "Discovering and exploiting 25 program phases", IEEE micro 23, 6, pp. 84-93 (2003).
Song, "Security Tagging for a Real-time Zero-kernel Operating System: Implementation and Verification", Ph.D. Dissertation. University of Idaho, pp. 1-161 (2014).
Song and Alves-Foss, "Security Tagging for a 30 Zero-Kernel Operating System. In System Sciences (HICSS)", 46th Hawaii International Conference on. IEEE, pp. 5049-5058 (2013).
Gregory T Sullivan, André DeHon, Steven Milburn, Eli Boling, Marco Ciaffi, Jothy Rosenberg, and Andrew Sutherland. 2017. The Dover inherently secure processor. In 2017 IEEE International Symposium on Technologies for Homeland Security (HST). IEEE, 1-5.
Tsampas, et al., "Towards automatic compartmentalization of C programs on capability machines", In Workshop on Foundations of Computer Security, pp. 1-14 (2017).
R. N. M. Watson, R. M. Norton, J. Woodruff, S. W. Moore, P. G. Neumann, J. Anderson, D. Chisnall, B. Davis, B. Laurie, M. Roe, N. H. Dave, K. Gudka, A. Joannou, A. T. Markettos, E. Maste, S. J. Murdoch, C. Rothwell, S. D. Son, and M. Vadera. 2016. Fast Protection-Domain Crossing in the CHERI Capability-System Architecture. IEEE Micro 36, 5 (Sep. 2016), 38-49. https://doi.org/10.1109/MM.2016.84.
Emmett Witchel, Junghwan Rhee, and Krste Asanović. 2005. Mondrix: Memory Isolation for Linux Using Mondriaan Memory Protection. In Proceedings of the Twentieth ACM Symposium on Operating Systems Principles (SOSP '05). ACM, New York, NY, USA, 31-44. https://doi.org/10.1145/1095810.1095814.
Woodruff, et al., "The CHERI capability model: Revisiting RISC in an age of risk", In Proc. of the International Symposium on Computer Architecture (ISCA), pp. 457-468 (2014).
Nick Roessler and André DeHon. 2021. SCALPEL: Exploring the Limits of Tag-enforced Compartmentalization. J. Emerg. Technol. Comput. Syst. 18, 1, Article 2 (Jan. 2022), 28 pages. https://doi.org/10.1145/3461673.
Roessler, Nicholas, "Policy Implementation And Engineering For Tagged Architectures" (2021). Publicly Accessible Penn Dissertations. 4228.
Commonly-Assigned, co-pending U.S. Appl. No. 18/113,254 for "Methods, Systems, and Computer Readable Media for Automati-

(56) References Cited

OTHER PUBLICATIONS cally Generating Compartmentalization Security Policies and Rule Prefetching Acceleration for Tagged Processor Architectures" (Unpublished, filed Feb. 23, 2023).

* cited by examiner

FIG. 2

| UNIT | DESIGN | ORGANIZATION | AREA (mm²) | ACCESS ENERGY R/W (pJ) | STATIC POWER (pJ/CYC) | LATENCY (PC) | CYC |
|---|---|---|---|---|---|---|---|
| REGISTER FILE (INT. AND FP) | BASELINE | 64b, 2R1W, {32 INTEGER, 32 FLOATING} | 0.003 | 1.5/1.5 | 0.0 | 490 | 1 |
| | 10b-TAG | 74b, 2R1W, {48 INTEGER, 32 FLOATING} | 0.004 | 2.0/2.1 | 0.0 | 530 | 1 |
| | 12b-TAG | 76b, 2R1W, {48 INTEGER, 32 FLOATING} | 0.005 | 2.0/2.2 | 0.0 | 530 | 1 |
| L1-S (I AND D) | BASELINE | 64KB, 4-WAY, 64B/LINE | 0.082 | 12.0/9.7 | 0.04 | 900 | 1 |
| | 10b-TAG | 74KB, 4-WAY, 74B/LINE (EFF. 64KB, 64B/LINE) | 0.108 | 16.6/15.1 | 0.05 | 940 | 1 |
| | 12b-TAG | 76KB, 4-WAY, 76B/LINE (EFF. 64KB, 64B/LINE) | 0.109 | 17.0/15.5 | 0.05 | 940 | 1 |
| L2-S | BASELINE | 512KB, 8-WAY, 64B/LINE | 0.596 | 22.9/28.0 | 0.37 | 2510 | 1 |
| | 14b-TAG | 624KB, 8-WAY, 78B/LINE (EFF. 512KB, 64B/LINE) | 0.71 | 30.2/35.8 | 0.45 | 2600 | 1 |
| | 15b-TAG | 632KB, 8-WAY, 79B/LINE (EFF. 512KB, 64B/LINE) | 0.709 | 30.6/36.1 | 0.45 | 2580 | 1 |
| TLB | - | 1KB, 2-WAY SET-ASSOC. | 0.013 | 1.4/3.5 | 0.01 | 910 | 1 |
| DRAM | BASELINE | 1GB, ACCESS 64B LINE PER TRANSFER | | 15,000 | | | 100 |
| | 64b-TAG | 1GB, ACCESS 128B LINE (MOVE 76B) | | 17,500 | | | 112 |
| | 64b-TAG | 1GB, ACCESS 128B LINE (MOVE 66B) | | 15,200 | | | 101 |
| OPCODE | | | 0.001 | 0.0 | 0.0 | 540 | 1 |
| FULL → L2-TAG | 64b → 14b | 512X16 SRAM | 0.386 | 17.1/80.6 | 0.2 | 2310 | 3 |
| | 64b → 15b | 8196-ENTRY, 58b MATCH, 14b OUT dMHC (4,2) | 0.388 | 17.3/81.0 | 0.2 | 2310 | 3 |
| L2-TAG → FULL | 14b → 64b | 8196-ENTRY, 64b MATCH, 15b OUT dMHC (4,2) | 0.141 | 9.3/12.1 | 0.09 | 1570 | 2 |
| | 15b → 64b | 16KX64 SRAM | 0.261 | 14.7/15.6 | 0.17 | 1680 | 2 |
| L2-TAG → L1-TAG | 14b → 10b | 32KX64 SRAM | 0.023 | 1.4/1.3 | 0.02 | 940 | 1 |
| | 15b → 11b | 16KX10 SRAM | 0.051 | 2.2/2.1 | 0.03 | 1070 | 2 |
| L1-TAG → L2-TAG | 10b → 14b | 32KX11 SRAM | 0.002 | 0.4/0.4 | 0.0 | 560 | 1 |
| | 11b → 15b | 1KX14 SRAM | 0.004 | 0.6/0.6 | 0.0 | 680 | 1 |
| UCP-S | 64b TAGS | 1KX14 SRAM | 0.238 | 23.1/73.7 | 0.11 | 1790 | 2 |
| CTAG-S | 64b TAGS | 2048-ENTRY, 328b MATCH, 128b OUT FAST-VALUE dMHC (4,2) | 0.047 | 10.6/38.9 | 0.02 | 1440 | 2 |
| L1 PUMP-S | 10b L1 TAG | 512-ENTRY 2-LEVEL dMHC | 0.101 | 6.5/30.1 | 0.06 | 670 | 1 |
| | 12b L1 TAG | 4096-ENTRY, 58b MATCH, 68b OUT, 24b OUT +11b COUNTER | 0.117 | 8.6/34.1 | 0.06 | 730 | 1 |
| | 2-8b TAG | FAST-VALUE dMHC (4,2) +11b COUNTER | 0.103 | TAB. 1, 2 | 0.05 | <600 | 1 |
| L2 PUMP-S | 14b L2 TAG | 4096-ENTRY, 78b MATCH, 28b OUT 2-LEVEL dMHC (4,2) | 0.186 | 11.0/47.7 | 0.11 | 1780 | 2 |
| | 15b L2 TAG | 4096-ENTRY, 83b MATCH, 30b OUT +11b COUNTER | 0.201 | 12.4/50.4 | 0.12 | 1810 | 2 |
| WATCH TABLE | 64b TAG | 512-ENTRY 2-LEVEL dMHC (4,2), 24b COUNTER | 0.018 | 3.4/13.9 | 0.01 | 1230 | 2 |

FIG. 6

METHODS, SYSTEMS, AND COMPUTER READABLE MEDIA FOR MAIN MEMORY TAG COMPRESSION

PRIORITY CLAIM

This application claims the benefit of U.S. Provisional Patent Application Ser. No. 62/982,550, filed Feb. 27, 2020; the disclosure of which is incorporated herein by reference in its entirety.

GOVERNMENT INTEREST

This invention was made with government support under HR0011-18-C-0011 awarded by Department of Defense. The government has certain rights in the invention.

TECHNICAL FIELD

This specification relates generally to metadata processing systems for processor architectures. More specifically, the subject matter relates to methods, systems, and computer readable media for main memory tag compression.

BACKGROUND

Today's computer systems are notoriously hard to secure, and conventional processor architectures are partly to blame, admitting behaviors (pointer forging, buffer overflows, etc.) that blatantly violate higher-level abstractions. The burden of closing the gap between programming language and hardware is left to software, where the cost of enforcing airtight abstractions is often deemed too high.

Recently, some systems have demonstrated the value of propagating metadata during execution to enforce policies that catch safety violations and malicious attacks as they occur. These policies can be enforced in software, but typically with high overheads that discourage their deployment or motivate coarse approximations providing less protection. Hardware support for fixed policies can often reduce the overhead to acceptable levels and prevent a large fraction of today's attacks. However, attacks rapidly evolve to exploit any remaining forms of vulnerability.

One flexible security architecture for resolving some of these issues may include a programmable unit for metadata processing (PUMP) system. A PUMP system may indivisibly associate a metadata tag with every word (e.g., a 64-bit sized memory unit) in the system's main memory, caches, and registers. To support unbounded metadata, the tag may be large enough to point or indirect to a data structure in memory. On every instruction, the tags of the inputs can be used to determine if the operation is allowed and, if so, to determine the tags for the results. The tag checking and propagation rules can be defined in software; however, to minimize performance impact, these rules may be cached in a hardware structure, the PUMP rule cache, that operates in parallel with an arithmetic logic unit (ALU). A software miss handler may service cache misses based on the policy rule set currently in effect.

However, a simple, direct implementation of the PUMP is rather expensive. For example, adding pointer-sized (64-bit) tags to 64-bit words at least doubles the size requirement of main memory, e.g., dynamic random access memory (DRAM).

SUMMARY

This specification relates to methods, systems, and computer readable media for main memory tag compression.

Some aspects of the present subject matter described herein relate to enforcing security policies in processor environments with compact metadata memory requirements by utilizing short tags (e.g., 16-bit tags that are smaller in size than a pointer size needed to solely convey a memory address containing metadata) in main memory to reduce memory requirement. Further, some aspects of the present subject matter described herein relate to various methods, techniques, mechanisms, and/or systems for using main memory tag compression by translating, deriving, and/or converting a short tag into a full tag or long tag (e.g., 64-bit) that indicates a memory address containing metadata.

One example method for using main memory tag compression occurs at a metadata processing system for enforcing security policies in a processor architecture. The method comprises: receiving, at the metadata processing system, a first tag associated with a word in memory; translating the first tag, using a tag map, into a second tag, wherein the first tag indicates a location of the second tag relative to an offset in the tag map and wherein the second tag indicates a memory location containing metadata associated with the word or an instruction; obtaining the metadata from the memory location; and determining, using the metadata, whether the word or the instruction violates a security policy.

The subject matter described herein may be implemented in hardware, software, firmware, or any combination thereof. As such, the terms "function" or "node" as used herein refer to hardware, which may also include software and/or firmware components, for implementing the feature (s) being described. In some exemplary implementations, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Embodiments of the subject matter described herein will now be explained with reference to the accompanying drawing, wherein like reference numerals represent like parts, of which:

FIG. 2 shows a diagram illustrating policies and characteristics associated with different metadata tag usage;

FIG. 6 shows some memory resource estimations for various implementations on a 22-nanometer node;

DETAILED DESCRIPTION

Figure 1:
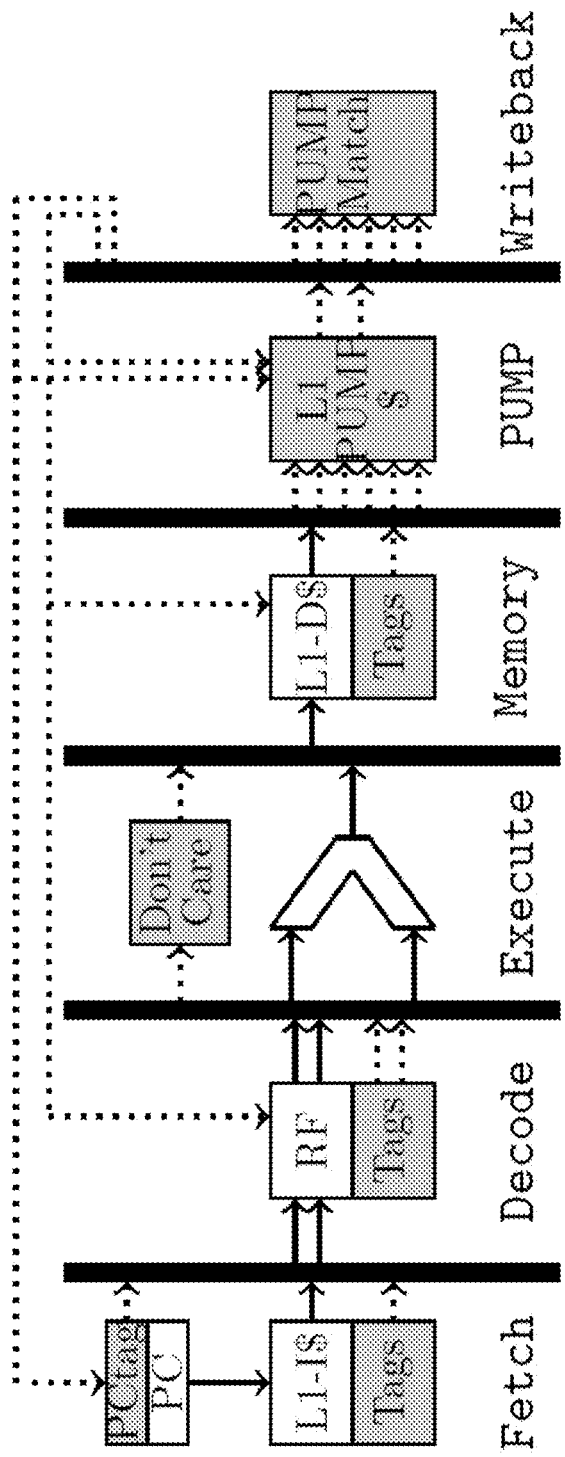
FIG. 1 is a diagram illustrating an example programmable unit for metadata processing (PUMP) rule cache in a processor pipeline.

This specification relates to methods, systems, and computer readable media for using main memory tag compression. Over the last decade, a growing body of work has demonstrated the benefits of attaching metadata to the values carried through a computation at runtime and using that metadata to enforce safety and security policies [1, 2, 3, 4, 5, 6]. Initial, modest versions used a single bit of data to track the flow of untrusted, external inputs [7] and uninitialized or unallocated memory locations [8]. More recently, more sophisticated versions use more data to track call and return sites [9] and full memory safety [10, 11, 12, 13]. This has prompted clever solutions that show powerful protections possible with just a few bits of metadata [14, 15], as well as demonstrations that these limited schemes provide less protection than the richer versions they approximate [16, 17]. Recent work shows how hardware acceleration can support rich, unbounded programmable metadata processing [18, 19, 20], perhaps at the cost of carrying large (e.g., 64-bit) metadata tags throughout the computation.

In an era with heightened demand for both low-energy computation and increased safety and security of our computation, this creates a quandary. Using little or no metadata keeps energy usage low, but forgoes hardware support for safety and security. Safety and security can be optionally enforced in software when needed, but with high runtime, and, consequently, energy, overhead (e.g., 67% runtime overhead for softbound [21]). Hardware support for large metadata allows rich policies, strong abstraction, and hardware acceleration, but imposes an energy cost on all programs, even those that do not use the rich metadata tagging features or could have been adequately protected with a more modest scheme. Can we build an architecture that supports energy-proportional, software-defined metadata processing, such that we spend just as much energy as needed to protect the application? Policy costs are driven by the width of the tags, the number of tag inputs and outputs, and the number of rules required to support them. These effectively drive the size of the memories that hold metadata-extended values. Since larger memories, with more content and more output bits, require more energy per operation, the number and width of tags and the number of rules drives the energy demands for a policy. Short tags with few rules could be accommodated with a small memory that adds little energy. Long tags with many rules demand a large, energy expensive memory.

The trick then is to use as small a memory as possible for a given policy. The first step might be to only use $\log_2$ (|Tags|) bits and small memories that just hold the number of required rules. However, we can go further by noticing that (a) not all tags are used with equal frequency, (b) not all rules are used with equal frequency, and (c) the frequency of tag and rule uses changes over time throughout the execution of a program. Consequently, if we can support variable-width tags that are encoded adaptively based on their usage, we can compress the average tag length close to the entropy level, or information content, of the tag. Furthermore, if we provide a variety of rule caches that accommodate tags of different lengths, we can spend energy checking and computing tags that is proportional to their complexity and usage. The most commonly used tags and rules can be resolved in the smallest and hence least energy expensive rule caches. This allows us to spend energy proportional to the complexity of the policy in use.

To support this adaptive tag compression scheme, we can collect statistics on rule usage during runtime. A naive version would demand that we collect usage counts on every rule and perform periodic encoding over millions of tags. However, we observe that most of the gains can be obtained by only encoding the most frequently used 100-1000 tags. Consequently, we introduce a lightweight tracking scheme that attempts to identify only the top 100-1000 tags and give them short, variable length codes, allowing the remaining tags to be uniformly encoded.

As a result, we see that even sophisticated, composite policies that require millions of tags and rules have an average used tag length of 2-4 bits. This reduces the energy overhead for these rich policies from 60% to 20%. Trivial policies can be implemented with 5% overhead, while very fine-grained policies with tens of millions of tags can be supported, driving the energy overhead up to 80%.

2. Architecture

Informally, our machine model allows the definition and acceleration of arbitrary metadata processing. We first define the conceptual Software Defined Metadata Processing (SDMP) model, then how it can be implemented, and introduce a standard form for abstractly specifying the policies allowed by this model.

In one example SDMP model, every machine word in the address space of the computation is atomically linked to an associated piece of metadata. As part of the atomic execution of every machine-level instruction, the machine also performs a calculation based on the metadata of the inputs to the instruction to determine if the instruction is valid and what the metadata on the results of the instruction should be. The metadata inputs to an instruction include the metadata on the instruction word itself (CI), the metadata on the program counter (PC), the metadata on the operands to the instruction (OP1, OP2), and the metadata on the memory location being read or written (MR). The metadata output includes the metadata on the result, either a value written to a register or a memory location (R') and the metadata on the program counter (PC). The mapping from metadata inputs to instruction validation and metadata outputs is defined by software and can be any proper function from the provided inputs, including the opcode of the instruction, to the outputs.

A correct, but inefficient, implementation of the SDMP model would run the software metadata mapping function before allowing each instruction to commit. However, since the software metadata mapping function can require tens to thousands of instructions to execute depending on the complexity of the security policy, this would add orders of magnitude runtime and energy overhead to program execution.

Nonetheless, this overhead can largely be avoided using suitable metadata encoding and caching. In particular, one example implementation of a more efficient SDMP model represents the metadata with a 64-bit (64b) tag on a 64b word and caches the mapping from the opcode and the five metadata inputs to the two metadata outputs. The 64b tag supports unbounded metadata by serving as a pointer to an immutable data structure representing the metadata for a machine word.

FIG. 1 is a diagram illustrating an example programmable unit for metadata processing (PUMP) rule cache in a processor pipeline. For a suitable small cache, cached mapping between the opcode and metadata and the metadata outputs can be implemented in a single machine cycle as a separate stage in the processor pipeline, so that it adds no additional runtime cycles in the common case of a cache hit (see FIG. 1). Each mapping from a unique opcode and concrete tags for metadata input set to an output is a concrete rule. For example, a type checking rule that checked that said the sum of two integers (INT) is an integer and also checked that the current instruction was tagged as an instruction (INSTR) might look like:

add:(DEFAULT,INSTR,INT,INT,DEFAULT))→(DEFAULT,INT)

Here, the PC tag has a default value (DEFAULT) and the add operation does not get a tag from memory. The cache on concrete rules is a PUMP (Programmable Unit for Metadata Processing) system. This concrete implementation benefits from the fact that, when properly canonicalized, the number of unique metadata descriptions, and hence concrete 64b tags, is small and the locality of tags is high enough that the working set required for rules is also small. A significant issue defining the complexity of supporting a particular safety or security policy, or combination thereof, is the number of unique tags and rules.

The concrete implementation can be further optimized by exploiting a number of common properties in the rules. To reduce the number of concrete rules, and hence reduce the pressure on the small PUMP cache, we can group together opcodes which are treated identically by the metadata policy into opgroups. Also to reduce the number of concrete rules, based on the opgroups, we use a care vector to mask out unused inputs to a concrete rule before performing the cache lookup in the PUMP. To reduce the size and complexity of the most commonly used instruction and data caches, as well as the PUMP caches, efficient implementations translate full, 64b tags, to shorter tags for use in the levels of the memory system closest to the processor. To reduce the cost of transferring tags from main memory, implementations can exploit spatial locality in tags to only transfer the unique tags in each cache line and their mapping to words in the cache line. To efficiently support powerful policies that can be described as a composition of more basic policies, the microarchitecture may include caches on the component policies.

A compact way to define SDMP policies is to express rules in terms of symbolic variables. These symbolic rules provide roughly the same mapping as the concrete rules, and are of the form:

opgroup:(PC,$CI$,$OP_1$,$OP_2$,$MR$)→(PC',R') if guard?

Symbolic rules differ from concrete rules in that they can use abstract data structures for the metadata and can be written in terms of relationships between the symbolic metadata in the inputs and outputs of the symbolic rules. A small number of symbolic rules can define the behavior of a policy over an unbounded number of concrete tags. We might generalize the above typing rule to work for any 2-input arithmetic operation (e.g., add, subtract, multiply, xor) and say that any input type (type) produced an output of the same type.

ar2s1d:(−,INSTR,type,type,—)→(−,type)

For this operation, we leave the PC unchanged and ignore the non-present memory input, so mark them as don't-cares.

3. Policies

The SDMP model allows us to define a large range of safety and security policies of varying complexity. In this section, we define a set of illustrative policies and characterize their complexity along several axes.

Taint Tracking.

Modern tag protection started with a single bit tag to differentiate untrusted data (e.g., data entering the program from the network or a file) from trusted data (e.g., data and instructions that are part of the program executable) [7]. The simple policy would mark all data coming directly from some input stream as untrusted. Then, as instructions compute on these inputs, all outputs derived from untrusted sources are also marked untrusted 20 using rules like:

ar2s1d:(−,TRUSTED,$op_1$,$op_2$,−)→(−,min($op_1$,$op_2$))

Which says that any of the 2-operand arithmetic instructions produce a trusted output, only when both operands are trusted (taking UNTRUSTED<TRUSTED). Furthermore, the operation is only allowed if the instruction itself remains trusted, preventing the processor from executing data that comes from an input stream as code.

As more bits become available to express policies, we can extend this simple taint tracking to distinguish sources. For input streams, we can assign a unique tag to each stream so we can identify the sources that contribute to each output. The metadata tag on tainted data can now be extended to a set to represent the contributing sources, and the rule extended to compute the set union:

$$ar2s1d:(-,op_1,op_2,-)\rightarrow(-,op_1\cup op_2) \quad (1)$$

We can also add unique tags to portions of the code and taint outputs based on the code that participated in its production:

$$ar2s1d:(-,ci,op_1,op_2,-)\rightarrow(-,ci\cup op1\cup op2) \quad (2)$$

This allows us to place constraints on the interaction and flow of modules. For example, we might taint code in a less trusted library module (e.g., a jpeg rendering engine) and not allow any data tainted by this isolated module to be used in operations on a password or address book database.

The number of tag bits we need to identify initial sources will depend on the granularity at which we choose to tag the sources. For code we will explore tagging code by libraries, by their source file, and by individual functions. For input streams, we tag each file or network stream open uniquely. Since taints become sets of tags, the total number of tags could become the power set of the initial tags.

Figure 2:
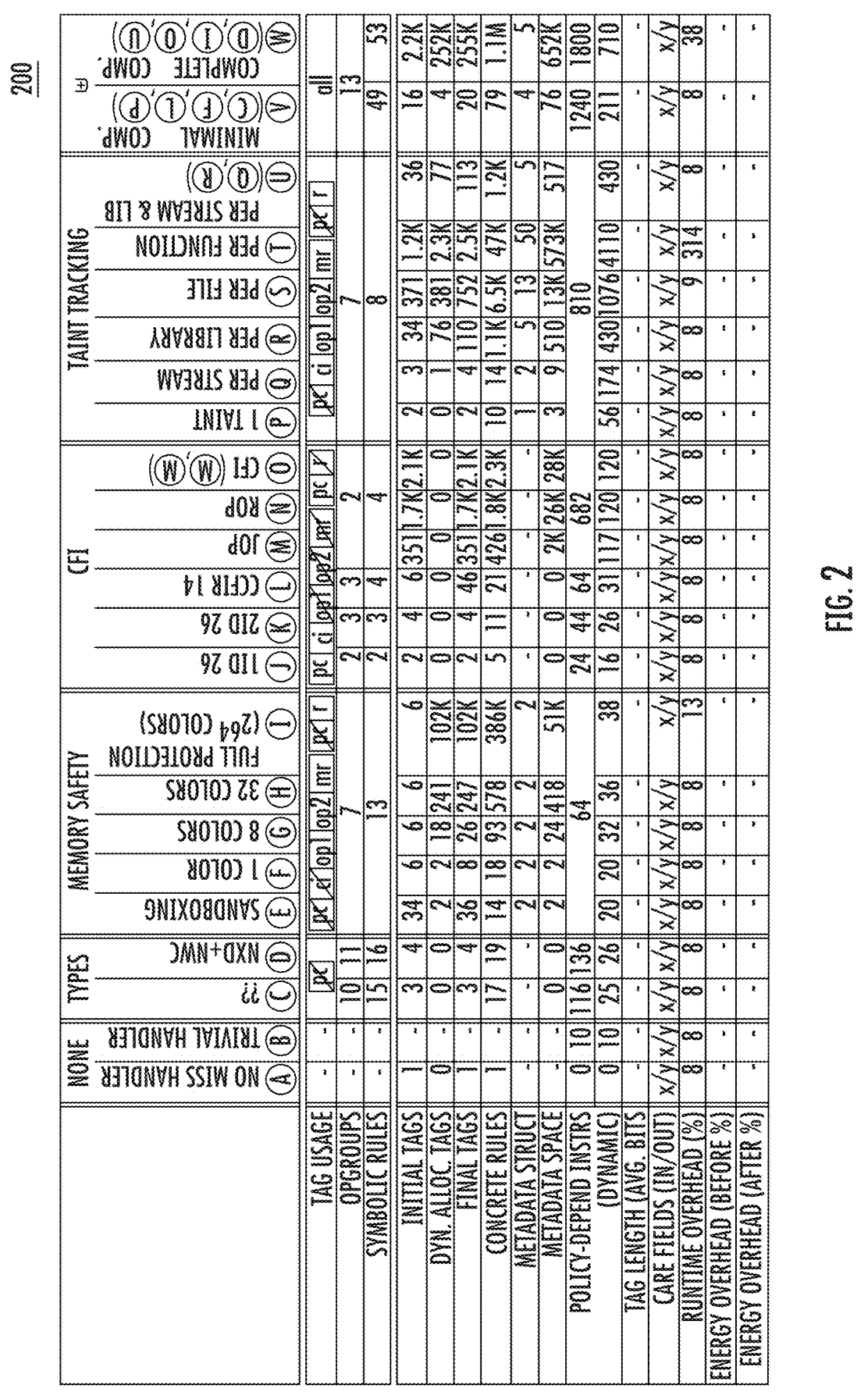

This creates a range of taint tracking policies from the simple 1b (two tag) trusted/untrusted policy to rich policies with thousands of tags requiring at least 12b of tag (see FIG. 2).

Memory Safety.

The simplest memory safety policies use a single tag bit to differentiate allocated and unallocated memory addresses on the heap [8, 22, 23]. For complete heap memory safety, a unique tag is allocated for every malloc, and the memory operation is only allowed if the tag of the allocation matches the tag of the pointer. This demands the potential to support an unlimited number of tags or, at least, a number of tags comparable to the number of words in the address space of the machine. Between these extremes, a limited number of tag bits can be used by allocating memory block tags, colors, modulo the total number of memory colors [24, 15]. While not providing complete memory safety, the limited color schemes make it less and less likely that an out-of-bound pointer can accidently be used to reference a different block. Another intermediate case provides fault isolation by allocating different tags for independent memory allocation pools [25].

Control Flow Integrity.

Simple control flow integrity (CFI) policies use just a few tags to identify valid function entry and return points to limit opportunities for return- and jump-oriented programming [26, 14]. However, these simple policies have been shown to still be vulnerable to attack [16, 17]. More complete policies [26] tag each function entry, return, and return point uniquely and include rules to limit transfers according to those allowed by the original program control flow graph. In addition to a complete CFI, we break out a set of rules that protect indirect jumps and calls (JOP) and returns (ROP).

Types.

To protect against simple code injection attacks, we can tag code separately from data to enforce a Non-Executable Data and Non-Writable Code (NXD+NWC) policy.

Composite Policies.

It would be unfortunate if we had to choose between a memory protection policy and a CFI policy. With SDMP there is no need to make this selection, as we can simultaneously support any number of policies. Exploiting the fact that the tags can serve as pointers, the tag pointer can point to a tuple containing metadata component tags for each of the policies. The policy function in software can destructure the composite metadata structure, resolve each policy independently, and create a composite policy tag for the result. For simple composites, the components are treated orthogonally, with the operation allowed only when all policies agree that the operation is allowed. Using the policies described so far, a write operation that occurred at a return entry point would only be allowed if the control transfer was from a valid return point, the instruction was suitably tagged as executable, the write pointer was not tainted as coming from certain libraries, the write pointer matched the memory cell addressed and was not tagged as non-writable. The resulting memory cell might be updated with the taint carried by the data, the instruction, the pointer used for the write, and the existing taint on the memory cell. We can create a range of composite policies with varying sophistication by selecting from the range of component policies (e.g., how many colors to use for memory-safety policy, which CFI, what granularity of taint tracking?).

The tag space for the composite policies are potentially the product set of each of the component policies. Since the memory safety and taint-tracking policies already require a potentially unbounded number of tags the composite policy is unbounded as well. In practice, the number tags needed grows even further, up into the millions of tags, demanding 20+ bits to represent the tags.

No Policy.

At the opposite extreme, we could install no policy. There is a single tag, a single opgroup, one rule that allows inputs with this single tag on the opgroup and produces the single tag as a result. This policy requires no tag bits.

Policy Characterization.

The previous discussion has shown how we can vary the level of protection provided by policies by selecting the number of tags used, the richness of the metadata structures, the rules supported, and the number of policies supported simultaneously.

FIG. 2 shows a diagram 200 illustrating policies and characteristics associated with different metadata tag usage. To begin to understand the varying complexities of these policies, we measure a number of characteristics including the runtime and energy overhead (see FIG. 2). Tag usage shows which tags are not used by any of the rules in the policy. Opgroups is the minimum number of opgroups needed to capture the policy; the fewer opgroups we use, the greater compression we get for concrete rules and hence the greater is the effective PUMP capacity. Symbolic rules is the number of symbolic rules we wrote to express the policy. Initial tags is the number of tags in the initial memory image before execution begins. During execution more tags will be dynamically allocated (dyn. alloc. tags). Furthermore, policies like taint tracking will create tags to represent unions of sets of taints, and composite policies will form tuples of individual policy tags. Final tags identify the number of tags that exist at the end of a one billion instruction simulation period; this gives some sense of policy complexity and can be used to infer the rate of tag creation. Concrete rules, the number of unique concrete rules generated during the simulation period, characterizes the number of compulsory misses needed to resolve symbolic rules to concrete rules and, effectively, the compulsory miss rate. Metadata struct, the average size in words of the data structure pointed to by each tag, illustrates the value of having unbounded metadata. Metadata space, the number of words required for all of the data structures holding policy-related information to which the metadata tags point, characterizes the memory overhead beyond the tags themselves. Policy-depend instrs is the total number of instructions required for the code that resolves symbolic rules to concrete ones; this is useful in understanding the complexity of the policy. Policy-depend instrs (dynamic) is the average number of policy-dependent instructions executed to resolve from a symbolic rule to a concrete rule; this is indicative of the runtime complexity of the miss handler for each of the policies. The impact of the policy-dependent portion depends on the complexity of the rules, the metadata data structures, the locality of the metadata data structures, and the need to allocate new result tags. The policy-independent part of the miss handler requires only a few tens of instructions (see column B in FIG. 2). Tag length (avg. bits) is the average number of tag bits required when we adaptively encode tags by usage. Care fields is the average number of non-don't-care fields in used rules. Runtime overhead is the ratio of wall-clock runtime for the application running the policy compared to a baseline processor with no PUMP. There is some runtime overhead just for adding hardware structures for tags and PUMP, even if no policy is used. This overhead is captured in the first column (A) where all tags are default, there is a single rule, and the miss handler is effectively never invoked. Energy overhead is the ratio of energy for the application running the policy compared to a baseline processor with no PUMP. We show the energy both before the optimizations introduced in this paper (corresponding to [18]) and after).

4. Tag Compression

The key energy expense in the PUMP rule cache is proportional to both the number of rules and the number of tag bits that are inputs and outputs to the rule. A policy with fewer tags and rules, running on architecture with fewer tag bits and a PUMP rule cache with fewer entries will require less energy (See Table 1).

TABLE 1

| PUMP | bits, rule entries | | | | | |
|---|---|---|---|---|---|---|
| Organization | 2b, 16 | 3b, 32 | 4b, 32 | 5b, 64 | 6b, 64 | 8b, 256 | 10b, 1024 |
| Energy (pJ) | 0.16 | 0.29 | 0.33 | 0.54 | 0.61 | 1.8 | 5.5 |

One idea for consuming less energy involves allowing variable length tags and supporting smaller PUMP rule caches. In addition to using narrower tags when the total number of tags in the policy is small, we also allow the tags within a single policy to vary in length. This allows the most commonly used tags to be short, consuming less energy, while the infrequently used tags can have longer encodings. In practice, tag usage is very localized.

Figure 3:
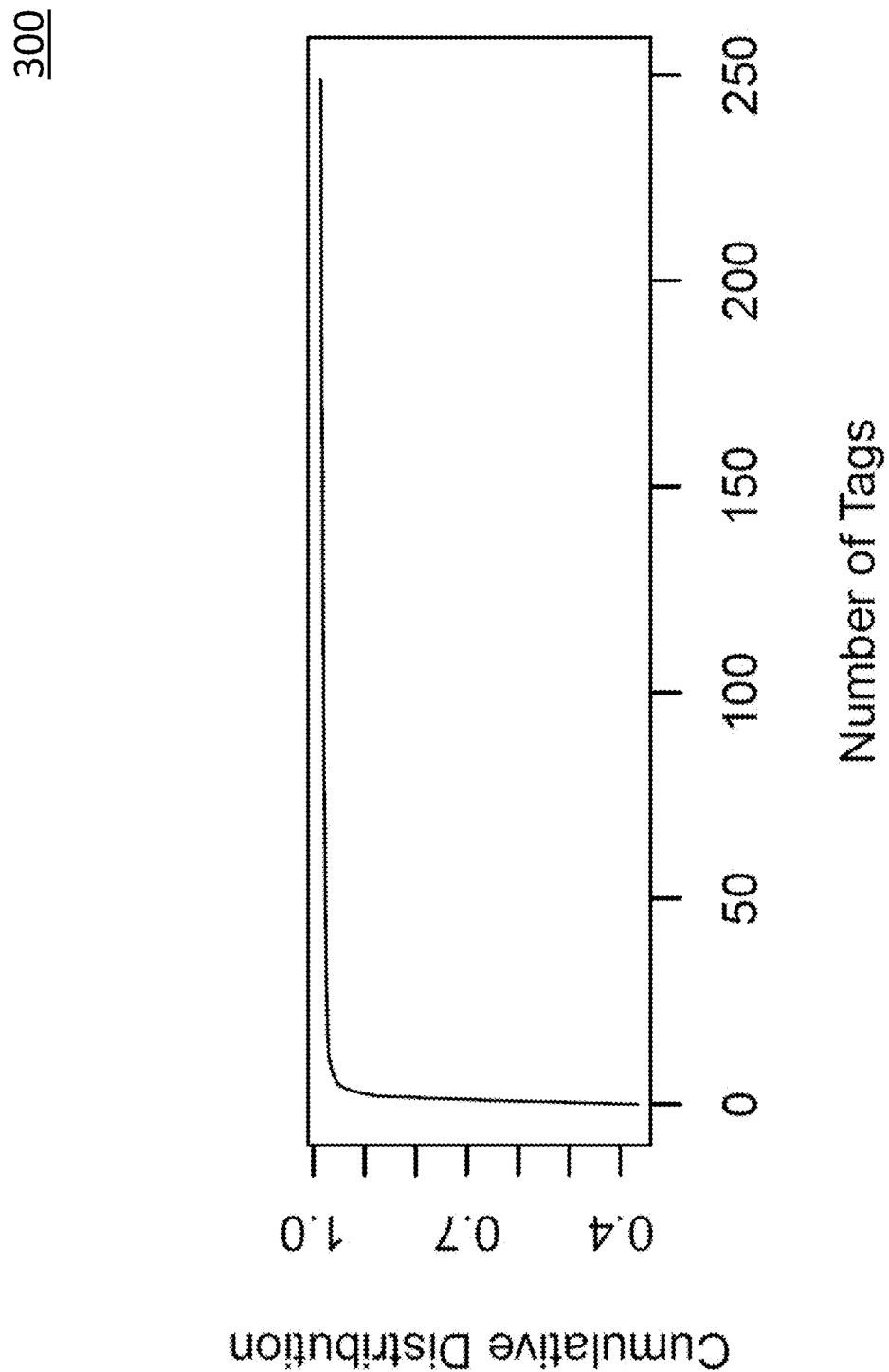
FIG. 3 is a diagram illustrating a cumulative distribution associated with different number of tags.

FIG. 3 illustrates a diagram 300 depicting the cumulative distribution function (CDF) for tags used in composite policy W for the gcc benchmark. This shows that the most used 7 tags correspond to 50% of the tags used, and the most used 25 tags correspond to 95% of the tags, suggesting there is significant opportunity to compress the tags even for a complex policy with over 0.25 million tags. The entropy of these tags is 3.8, and the average tag length with Huffman encoding is 4.2, much smaller than the 18b required in an equal-length tag assignment or even the 12b short tags used at the L1 cache level in [18].

Furthermore, the most common rules have short tag inputs. For example, a CDF for the maximum length of the tag in concrete rules used in composite policy W for the gcc benchmark may indicate that 50% of the concrete rules resolved have 3 or fewer tag bits in each care field and 90% have 7 or fewer bits. This suggests we can build smaller PUMPs to serve the shorter tags (Table 1) and satisfy most of our rule resolutions in these small PUMPs.

5. Selective Activation

Figure 4:
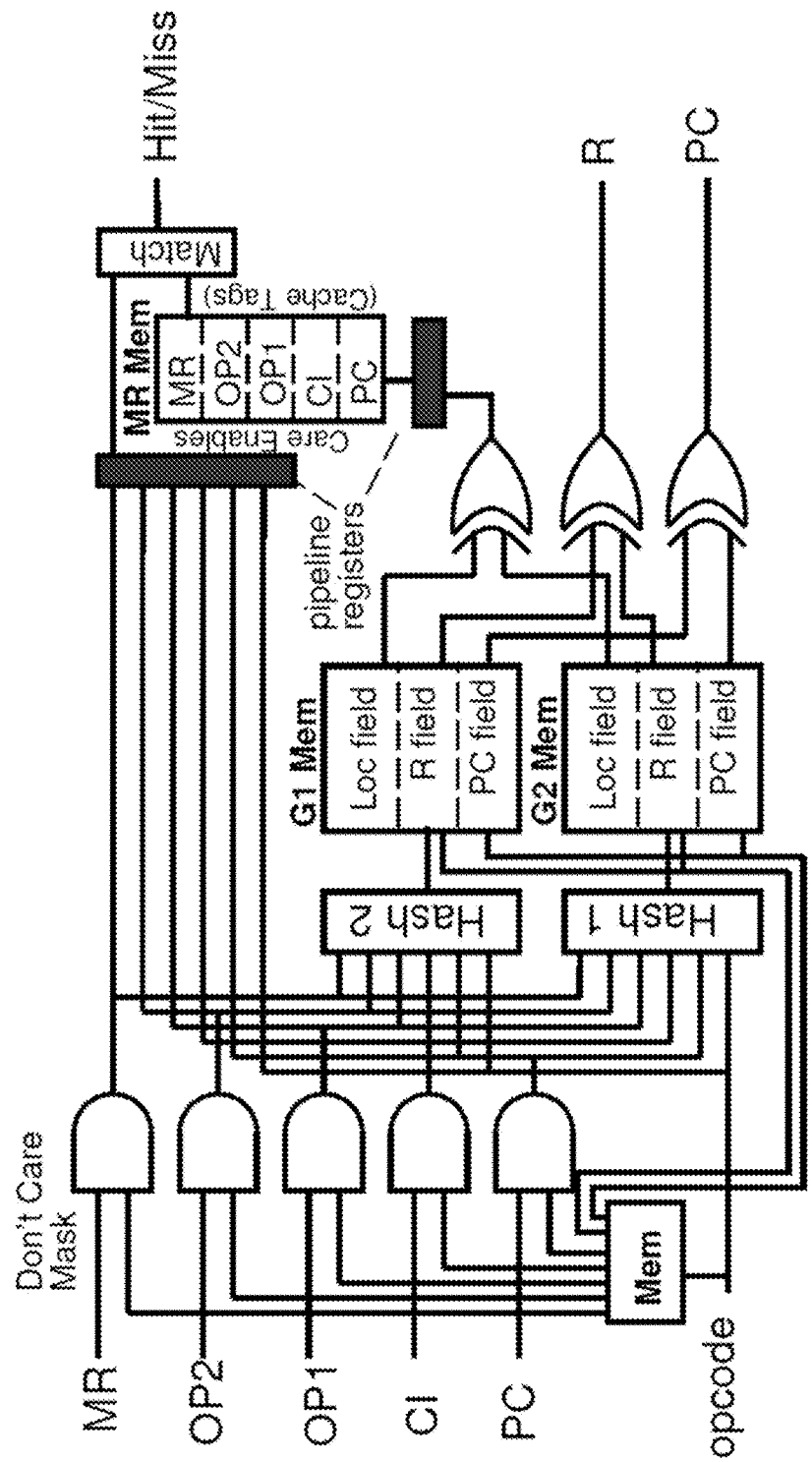
FIG. 4 is a diagram illustrating an example PUMP Microarchitecture with selective field activation.

FIG. 4 is a diagram illustrating an example PUMP Microarchitecture 400 with selective field activation. We can also reduce the number of inputs and outputs from the PUMP by observing that most rules have some don't-care bits and there is no need to activate the PUMP memories associated with the don't-care input and output fields (see FIG. 4). An example probability distribution function (PDF) for the number of input and output care bits used by concrete rules in the composite policy W for the gcc benchmark may illustrate that, even in the composite policy, few rules use all fields. The average number of input fields used is 3.2 and the average number of output fields is 1.1. Table 2 shows how energy varies with the used fields for a 6-bit PUMP with 64 entries.

TABLE 2

| output care | input care | | | | | |
|---|---|---|---|---|---|---|
| | 0 | 1 | 2 | 3 | 4 | 5 |
| 0 | 0.30 | 0.32 | 0.34 | 0.36 | 0.38 | 0.40 |
| 1 | 0.43 | 0.45 | 0.47 | 0.40 | 0.51 | 0.53 |
| 2 | 0.56 | 0.58 | 0.60 | 0.62 | 0.64 | 0.66 |

6. Main Memory

Energy is also spent moving tag bits to and from off-chip main memory. [18] showed that 90% of 512b (8, 64b words) cache-lines are tagged homogeneously. Nonetheless, they still transferred an entire 60b tag for each single tag cache line along with 32b of tag index. This means a minimum overhead of 18% for these common data transfers. They did not exploit tag compression. We note that the many policies use fewer than 214 tags, and even those that use more, have non-uniform tag usage, suggesting common tags can be made suitably short. To match a 2-byte DRAM granularity, we use the first 2b of the first 2 bytes to distinguish three common short-tag cases from the general case. For the shortest case, the remaining 14b encode the tag. We find 95% of the dynamic accesses to main memory for cache lines in gcc running composite policy W can be encoded with a single 14b tag, so we only need to transfer 2 bytes of metadata, or an overhead of only 3%. The other two short cases are the single tag 30b tag, which can be encoded in 4 bytes and the single tag 60b tag case that can be encoded in 8. For gcc policy W, this gets the average tag length communicated to/from main memory down to 3.1 bytes.

7. Microarchitecture for Tag Compression

Figure 5:
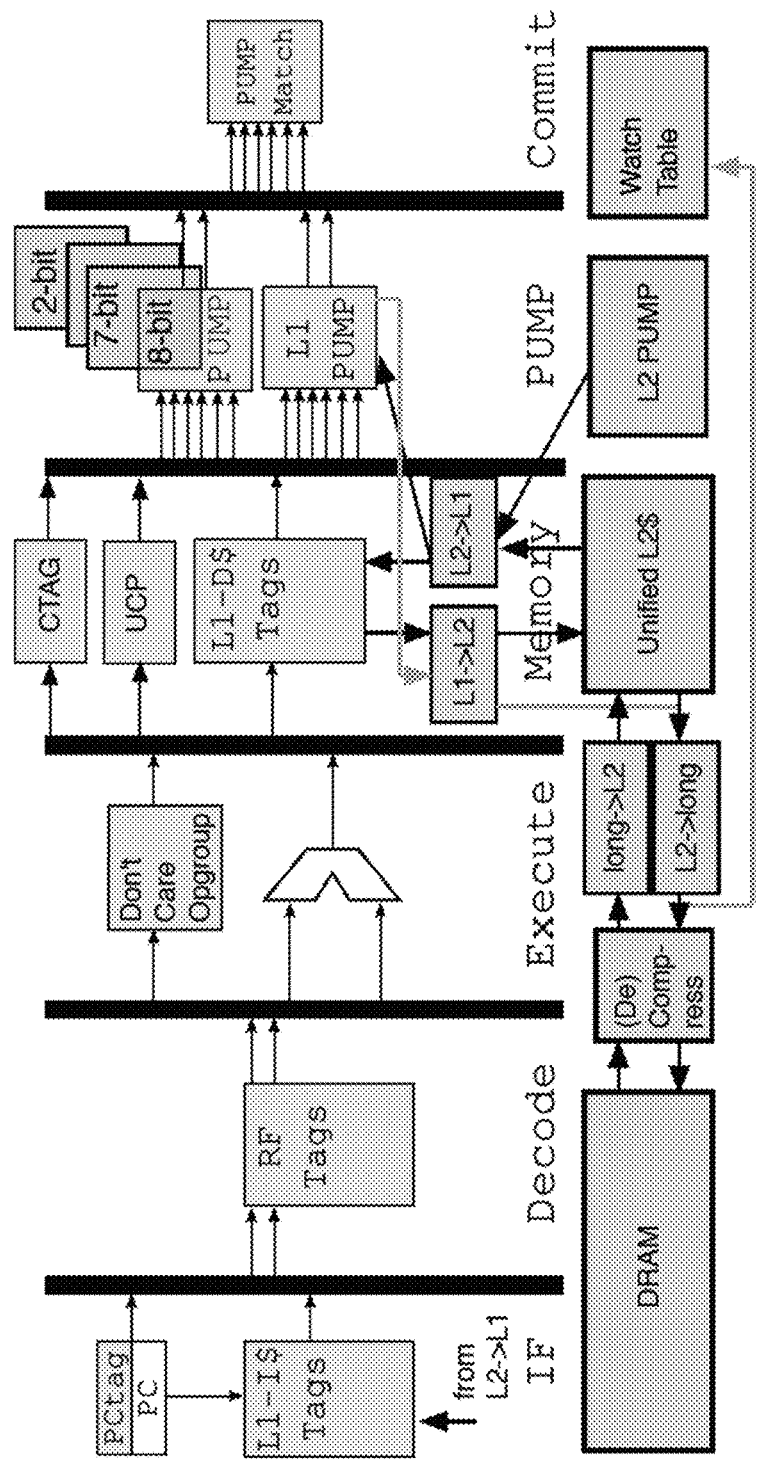
FIG. 5 is a diagram illustrating an example PUMP Microarchitecture with Bit PUMPs and a Watch Table.

To support and exploit energy proportionality and tag compression, we add smaller PUMPs, rule counters, and a Watch Table to keep track of usage counts on the most frequently used tags (FIG. 5). FIG. 5 depicts an example PUMP Microarchitecture 500 with Bit PUMPs and a Watch Table. In this example, PUMP Microarchitecture 500 provides different sized Bit PUMPs to support energy proportionality, where the smallest PUMP needed is energized for tag resolution so as to expend the least energy and where a watch table is used to store usage counts.

Bit PUMPs.

We add n-bit wide PUMP rule caches with 2 n 8, the Bit PUMPs, in parallel with the L1 PUMP rule cache (FIG. 5). During the Memory Stage, the pipeline computes a maximum of the length of the tags associated with the rule. Based on this maximum size, the tag resolution is directed to exactly one of the Bit PUMPs or the L1 PUMP. This way we energize the smallest PUMP that can resolve the rule to expend the least energy. When a Bit PUMP misses, the pipeline stalls and the rule is resolved in the PUMP hierarchy starting with the L1 PUMP, and the rule is inserted into the appropriate Bit PUMP.

To track tag usage, each rule has an associated counter while it lives in the Bit PUMPs and L1 PUMP. The counter is incremented on each rule use, and travels with the rule as it moves between the Bit PUMPs and L1 PUMP. When the counter overflows or the rule is evicted from the L1 PUMP, the counter is optionally moved to the watch table, crediting the count to every watched tag in the rule that is in the watch table.

Watch Table.

The Watch Table is a limited-size associated memory that holds the total usage count of the top k tags. The watch table stores the full-length, 64b, tag and its usage count estimate. When there is space in the watch table, and a rule count exceeds a specified threshold (Sec. 8), the tags for the rule are translated back to 64b tags and the count for the rule is inserted or updated in the watch table for each of the tags in the rule.

5 L1 Tag Encoding.

The L1 level of the PUMP architecture (PC, Register File, L1 I-cache, L1 D-cache, L1 PUMP) holds both variable-length and fixed-length tags. The high bit in the tag indicates if the tag is a variable- or fixed-width encoding.

For fixed-length tag, the remaining bits are the tag. For a variable-length tag, the next 3 bits encode the tag length, and the bottom bits are the actual tag value. This supports the Bit PUMP dispatch based on the maximum tag length for a rule.

Bit PUMP Sizing.

From an example CDF for rule usage for the Bit PUMPs, we may note that (a) no Bit PUMP needs more than 200 entries to hold 99% of PUMP references, and (b) the smaller Bit PUMPs (smaller n) need fewer entries than the larger Bit PUMPs. To minimize PUMP energy, we selected some capacities for the Bit PUMP (see Table 3). FIG. 6 shows some memory resource estimations for various implementations on a 22-nanometer node.

TABLE 3

| Architecture | Area (mm$^2$) | Ratio Basline |
|---|---|---|
| Baseline | 0.79 | 1.0 |
| Tagged (10 b, 14 b) | 2.07 | 2.6 |
| Adaptive Tagged (bitpumps, 12 b, 15 b) | 2.38 | 3.0 |

8. Software Support

The tags used by a program and their usage pattern is, in general, data dependent and varies within the execution lifetime of an application. To minimize the energy spent on tags, we would like to adaptively compress tags close to their information content. At the same time, we can also contain the amount of time and energy we spend computing the tag encoding. As a compromise to keep encoding time small, while adapting tag encodings, we re-encode tags periodically at the granularity of epochs, fixed-sized counts of cycles that provide a logical chunking of a program's trace into sections. At the beginning of an epoch, the system is reset, and the Watch Table is cleared and rule counts of Bit PUMP and L1 entries are set to 0. During the epoch, tags can be inserted into the Watch List; this happens when a rule is evicted from the L1 PUMP. A tag is added only if the usage count on the source rule in the L1 PUMP at the time of eviction is equal to or greater than the current threshold value. Because tags are added from rules, more than one tag may be added to the Watch List from a single eviction. If a tag is already in the Watch List when it would be inserted, the count is added to the current count instead to maintain a running sum. The work to compute tags between epochs is determined only by the size to the Watch Table, so larger epochs will reduce the encoding overhead. On the other hand, as the epoch size increases, the amount of time we may be running with out of data statistics, and hence sub-optimal tag encodings increases. For a Watch Table with 256 entries, we find that encoding requires around 100,000 cycles, or 2% of time for a five million (5M) cycle epoch.

For the Watch Table to provide a good approximation of the most frequently used tag set, the threshold value may need to be set appropriately. The threshold value serves as a measure of exclusivity over the limited size Watch Table. The larger the threshold the fewer evicted rules will make it into the Watch Table, and vice versa. The objective is to "catch" the highly used tags in the Watch Table and so the value of the threshold is important. If the threshold is too large, we will not fill up the watch table and miss the opportunity to give short encodings to some frequently used tags. A tag that is used many times in small bursts, being evicted from the PUMP caches between usage sets, may have many total uses, but never climb above the threshold such that its statistics are recorded. If the threshold is too small, the watch table may fill up before one of the high-usage tags is ever seen within the epoch. Since the rate of Watch Table filling is also data dependent, we employ a simple control loop to adapt the threshold between epochs based on how much of the Watch Table is left empty (threshold too high) or when the Watch Table filled up before the end of the epoch (threshold too low).

At the end of each epoch, the rules remaining in the Bit PUMPs and L1 PUMP are flushed into the Watch Table in the same fashion so that these counts are included in the Watch Table tag frequency counts. At this point, the tag statistics collection is complete, and a service routine is invoked to recompute tag encodings. The tag compression service routine uses the (tag, frequency) pairs from the Watch Table to compute the Huffman-coded [27] bit patterns for the captured tags. These encodings are installed into the long tag translation tables (FIG. 5) for use in the next epoch. By seeding the tag translation tables with these new tags, we guarantee the full tags are suitable translated to their compressed encodings. Once installed, the service routine returns execution to the application program. In this way, the system is always using the encoding from the previous epoch for the current epoch and preparing the encoding for the next epoch from current tag usage. This adaptivity allows the system to keep relevant encodings for highly used tags, a property that can change quickly as application runs (e.g., malloc creates new memory tags, control flow transitions between major phases and loops in the program).

Figure 7:
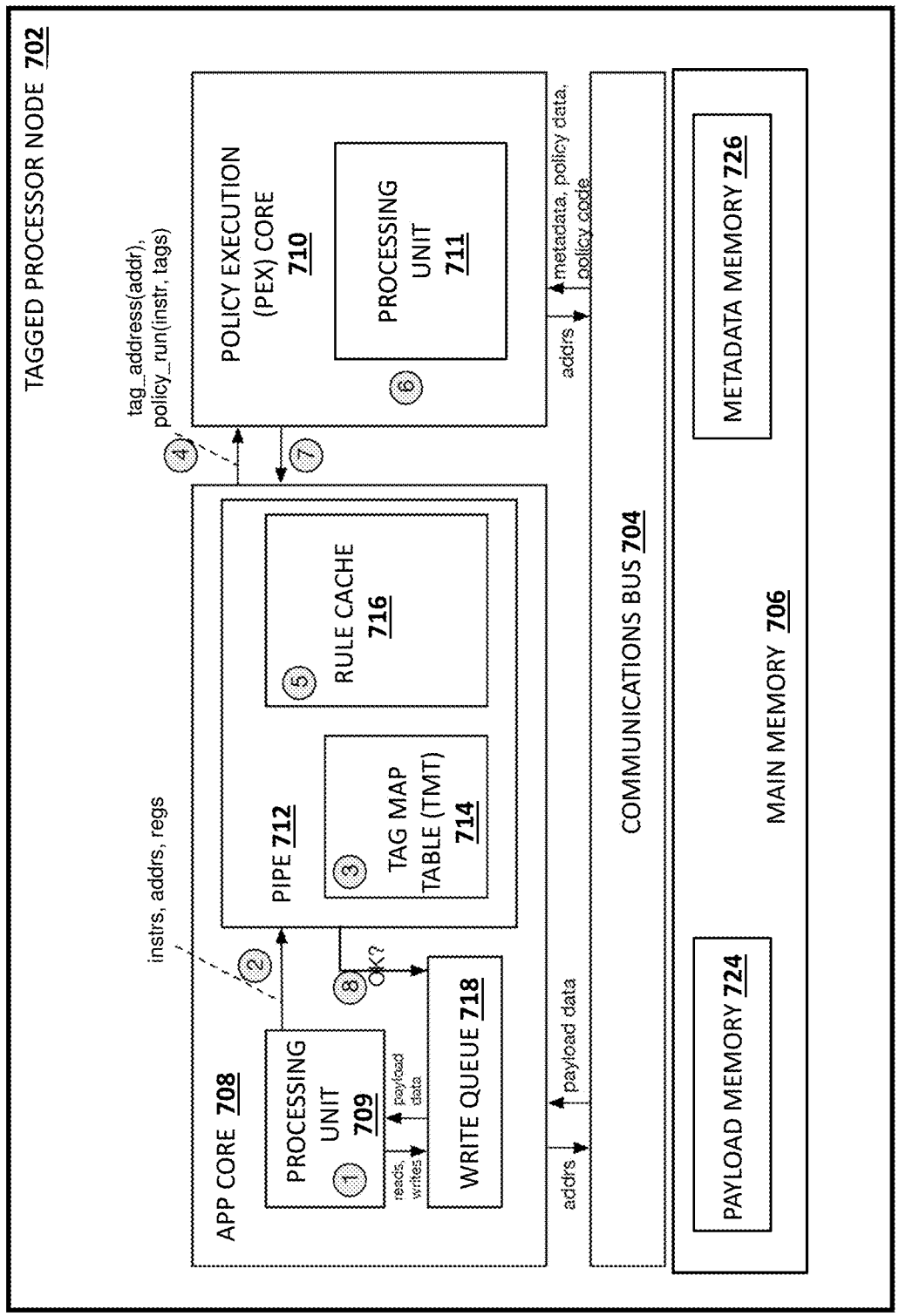
FIG. 7 is a diagram illustrating a high-level overview of an example tagged processor node for executing one or more security policies.

FIG. 7 is a diagram illustrating a high-level view of an example tagged processor node 702 for executing one or more security policies. Tagged processor node 702 may be any suitable entities, such as one or more single or multi-processor (e.g., RISC-V cores) computing devices or platforms, for performing one or more aspects for hardware-accelerated enforcement of security policies. In some embodiments, components, modules, and/or portions of node 702 may be implemented or distributed across multiple devices or computing platforms.

Node 702 may include a communications bus 704, a main memory 706, and one or more processors including an application (app) core 708 and a policy execution (PEX) core 710. Communications bus 704 may represent one or more suitable entities for communicating data or messages between various entities in node 702. For example, communications bus 704 may facilitate communications between main memory 706 and app core 708 and/or PEX core 710.

Main memory 706 may be any suitable entity (e.g., random access memory or flash memory) for storing various data (e.g., payload data) related to executing one or more applications and for storing metadata for one or more security policies. In some embodiments, main memory 706 may be off-chip (e.g., to cores 708-710) and may represent a main memory. Various components, such as communications interface(s) and software executing on cores 708-710 or related CPUs, may access main memory 706.

In some embodiments, main memory 706 may include a payload memory 724 for storing application data (e.g., integers, pointers, instructions, etc.) and a metadata memory 726 for storing metadata and/or tags involving one or more security policies. In such embodiments, metadata may describe or provide information about application data (also referred to herein application payloads or payloads). For example, suppose a payload word (e.g., a unit of memory, typically 64-bit or 32-bit depending on system architecture) used by the application (or operating system) is stored at address '0x1234' in payload memory 724. In this example, related metadata that describes the word or payload at '0x1234' is stored somewhere else in main memory 706, e.g., at address '0xEB5123' in metadata memory 726.

In some embodiments, metadata pointed to by a tag may be immutable. For example, if metadata describing a payload word changes, the metadata may be freshly allocated, thereby producing a new tag. Thus, in such embodiments, a particular tag (e.g., an address in metadata memory 726) identifies a particular, immutable, record of metadata values.

In some embodiments, memories 724 and 726 may be logical or physical partitions and/or may have different access permissions and/or capabilities. For example, metadata memory 726 may represent a portion of main memory accessible only to PEX core 710. In another example, payload memory 724 may represent a portion of main memory accessible only to app core 708 or with limited accessibility for PEX core 710.

App core 708 may represent one or more suitable entities (e.g., a physical processor, a field-programmable gateway array (FPGA), and/or an application-specific integrated circuit (ASIC)) for executing one or more applications. In some embodiments, app core 708 may include or interact with a processing unit (PU) 709 for processing instructions, a Processor Interlocks for Policy Enforcement component (PIPE) 712 comprising a tag map table (TMT) 714 and a rule cache 716, and a write queue 718 for buffering data for PU 709.

Each of TMT 714 and/or rule cache 716 may store data needed or used by app core 708 and/or PEX core 710 and may utilize or include high-speed static random access memory (SRAM) or other memory that is faster than main memory 706. In some embodiments, TMT 714 may store mappings between payload memory addresses and memory addresses for metadata describing respective payloads may be stored in TMT 714. In this example, given an address for a payload in payload memory 724, TMT 714 may be used to identify a corresponding tag indicating an address of metadata related to the payload in metadata memory 726.

In some embodiments, rule cache 716 may store policy rules, tags, and/or other data that is frequently used by PEX core 710. For example, frequently accessed policy rules or related metadata can be stored in rule cache 716 as such the processing time involved in enforcing a security policy is reduced since slower memory 726 does not need to be accessed.

PEX core 710 may represent one or more suitable entities (e.g., a physical processor, an FPGA, and/or an ASIC) for executing one or more security policies. For example, PEX core 710 may include a PU 711 for executing one or more security policies by analyzing metadata and payloads.

Referring to FIG. 7, an example security policy enforcement process for tagged processor node 702 involving steps 1-8 is discussed below.

In step 1, an instruction is fetched and executed on app core 708, where writes to memory may be queued in write queue 718.

In step 2, the instruction type, the instruction address, the addresses of any referenced memory, and indications of which registers are used are all sent to PIPE 712.

In step 3, the tags (e.g., addresses of metadata blocks) for register values (including Program Counter, PC) are stored locally within PIPE 712 and TMT 714 may be consulted for tags that correspond to application payload memory addresses.

In step 4, if TMT 714 does not have an entry for a given application memory address, PEX core 710 (or PU 711) or another entity (e.g., a cache miss handler) may obtain and return a tag for metadata, e.g., tag_address(addr).

In step 5, a key for looking up data in rule cache 716 is constructed. For example, a cache key may have six elements, e.g., an opcode instruction type (e.g. add, store, jump), a tag on the current program counter (PC) register, a tag on the word containing the current instruction (that is, the word in memory to which the PC points), a tag on a first operand to the instruction, a tag on a second operand to the instruction (if any), and a tag on memory referenced (if any). For example, for a load instruction, the address of the memory being referenced is in one of the operand registers. When the key is looked up in rule cache 716, a match is found or is not found.

If a match is found, then the cache record may contain additional data, e.g., a tag on the program counter (PC) register, an updated tag on the first operand to the instruction (if this instruction updates the first operand), an updated tag on the second operand to the instruction (if this instruction updates the second operand, and an updated tag on memory referenced (if any).

In step 6, rule cache miss occurs, a policy_run message is sent PEX core 710 (or PU 711), along with the values from the cache lookup key. For example, policy enforcement functions can be executed using metadata pointed to by the tags, where the metadata about each of the values being referenced on app core 708.

In step 7, the net result from running policy functions is either (1) a policy violation, in which case an error is returned and the AP receives an interrupt, or (2) the instruction is allowed, and tags (e.g., addresses of metadata) for any updated values are returned to PIPE 712.

Assuming the instruction is allowed, updated tags for written values (e.g., the output of an ADD instruction, or the tag for a word written by a STORE instruction), including the PC, are returned to PIPE 712. A new entry is added to rule cache 716, and the instruction is restarted, at which point a matching entry will be found in rule cache 716 and the instruction allowed.

In step 8, if the instruction is allowed by the policies, an OK signal is sent to write queue 718, and any pending write to main memory 706 is allowed to proceed.

It is notable that steps 4 (processing a TMT miss) and 6 (processing a PIPE cache miss) should occur only infrequently. For example, rule cache 716 may be provided for storing the most recently used rules. In this example, as long as a hit occurs using rule cache, extra cycles are not added.

In some embodiments, a PUMP rule cache (e.g., rule cache 716) may perform or utilize an associative mapping between an instruction opcode and five input tags and two output tags. In such embodiments, the PUMP rule cache may directly map between pointer tag inputs and pointer tag outputs without dereferencing the pointers or examining the metadata structures they point to. In such embodiments, failure cases may not be inserted into the PUMP rule cache since they transfer control to software cleanup.

In some embodiments (e.g. PUMP Microarchitecture 500), when a last-level miss occurs in a rule cache, it may be handled as follows: (i) the current opcode and tags are saved in a (new) set of processor registers used for this purpose and (ii) control is transferred to a policy miss handler, which (iii) invokes a policy function to decide if the operation is allowed (e.g. using data from main memory) and, if so, generates an appropriate rule. When the policy miss handler returns, hardware (iv) installs this rule into one or more rule cache(s), and (v) re-issues the faulting instruction. To provide isolation between a privileged miss handler and the rest of the system software and user code, a cache miss handler operational mode can be added to the processor, and can be controlled by a bit in the processor state. For example, a cache miss handler operational mode bit may be set on a last-level rule cache miss and may be reset (e.g., unset) when the miss handler returns.

In some embodiments (e.g. node 702), when a last-level rule cache miss occurs in a the rule cache (716), it may be handled as follows: (i) the current opcode and tags are transferred to a policy miss handler in the PEX core 710, which (ii) invokes a policy function to decide if the operation is allowed (e.g. using data from main memory 706) and, if so, generates an appropriate rule. When the policy miss handler returns, hardware (e.g., PEX core 710) (iii) installs this rule into one or more rule cache(s) (e.g., rule cache 716), and (iv) resolves the faulting instruction. To provide isolation between a privileged miss handler and the rest of the system software and user code, the PU core 709 does not have access to policy and metadata, only the PEX core 710.

In some embodiments, main memory tag compression may be used to reduce the size of tags stored in main memory (e.g., main memory 706). For example, adding pointer-sized (64-bit) tags to 64-bit words at least doubles the size of main memory in the system. However, if compression is used to reduce the size of each tag to less than 64-bits (while still allowing the number of tags to be unbounded (e.g., keep individual tag size proportionally to tag needs or usage)), then resource and energy usage requirements for node 702 or another metadata processing system can be reduced.

In some embodiments, main memory tag compression may involve using short tags (e.g., smaller than a memory address pointer) that can be translated or converted to larger-sized tags or long tags (e.g., pointer-sized tags) or vice versa. In such embodiments, a short tag may serve as shorthand for obtaining or indicating relevant metadata for a related instruction. For example, a short tag may indicate a value or offset to a location in a tag map (e.g., TMT 714) or tag space (e.g., a memory page), where the location in the memory page stores a long tag or otherwise indicates the location of relevant metadata. In some examples, if multiple pages exist, tagged processor node 702 or another metadata processing system may use software (e.g., a cache miss handler) to identify the correct tag map.

It will be appreciated that FIG. 7 is for illustrative purposes and that various entities, their locations, and/or their functions may be changed, altered, added, or removed. For example, some entities (e.g., components) and/or functions may be combined into a single entity. In a second example, an entity and/or function may be located at or implemented by two or more nodes.

Figure 8:
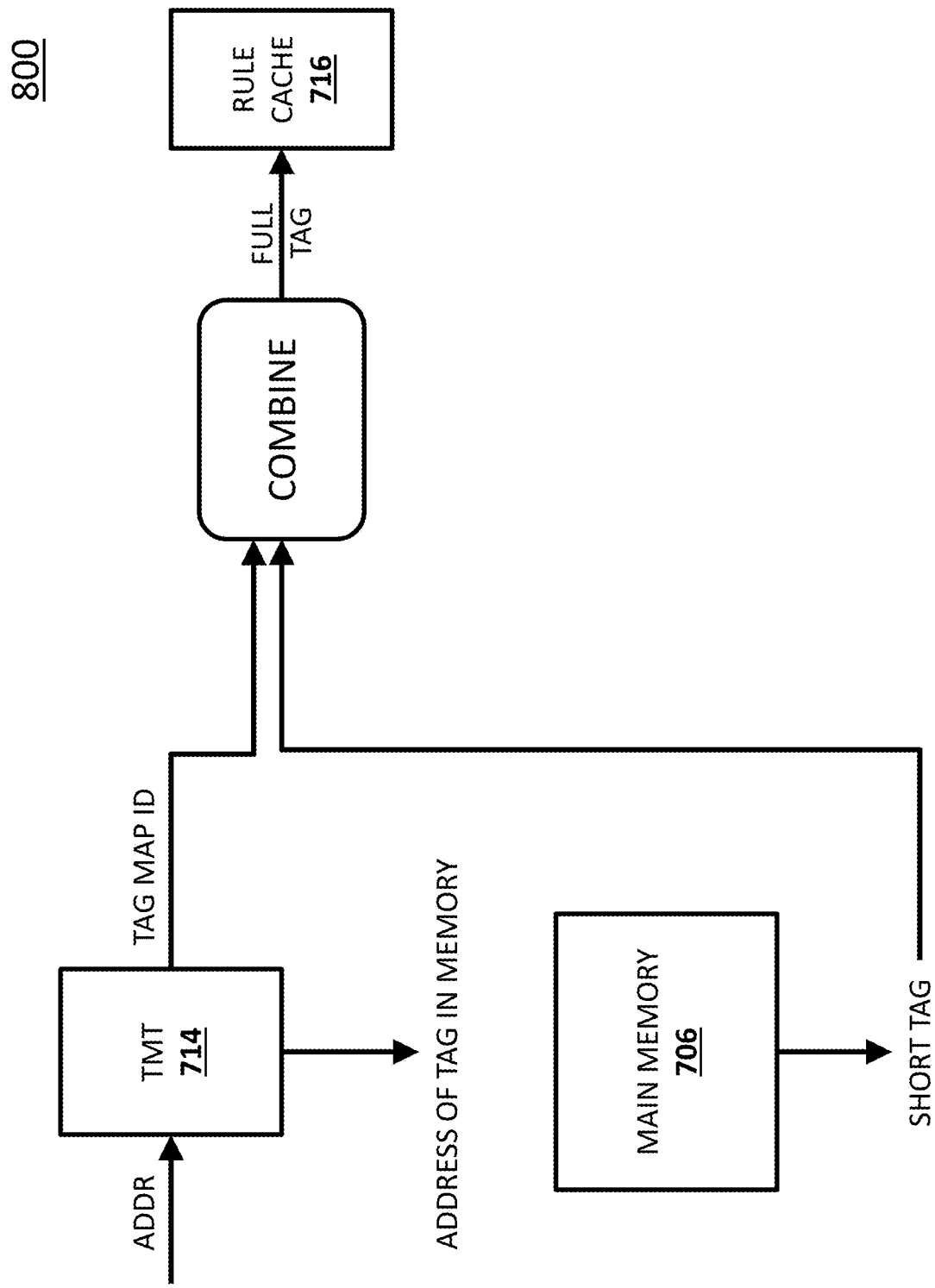
FIG. 8 is a diagram illustrating an example process for using a short tag and a tag map table (TMT) to derive a full tag.

FIG. 8 is a diagram illustrating an example process 800 for using a short tag and TMT 714 to derive a full tag. In some embodiments, process 800 may be augmented logic in PIPE 712 or another entity for deriving a long tag (e.g., a pointer-size value indicating a memory address containing metadata for a payload word) from a short tag (e.g., a smaller than pointer-size value that can identify a memory address using one or more schemes or techniques). In such embodiments, after determining a long tag, a memory address of main memory 706 (e.g., metadata memory 726) corresponding to the long tag may be accessed and metadata may be read and used in enforcing a security policy.

In some embodiments, e.g., to avoid repeating the process, PIPE 712 or another entity may store the long tag or corresponding metadata in a cache for faster subsequent metadata retrieval.

Referring to process 800, an address of a word in memory (e.g., payload memory 724) may be used to lookup a tag map identifier (ID) using TMT 714 and then the tag map ID and the short tag may be combined logically to create the metadata tag or full tag. In some embodiments, the full tag can be stored in a cache for future retrieval (e.g., without the need to retrieve a short tag from memory).

It will be appreciated that process 800 is for illustrative purposes and that different and/or additional actions may be used. It will also be appreciated that various actions described herein may occur in a different order or sequence.

Figure 9:
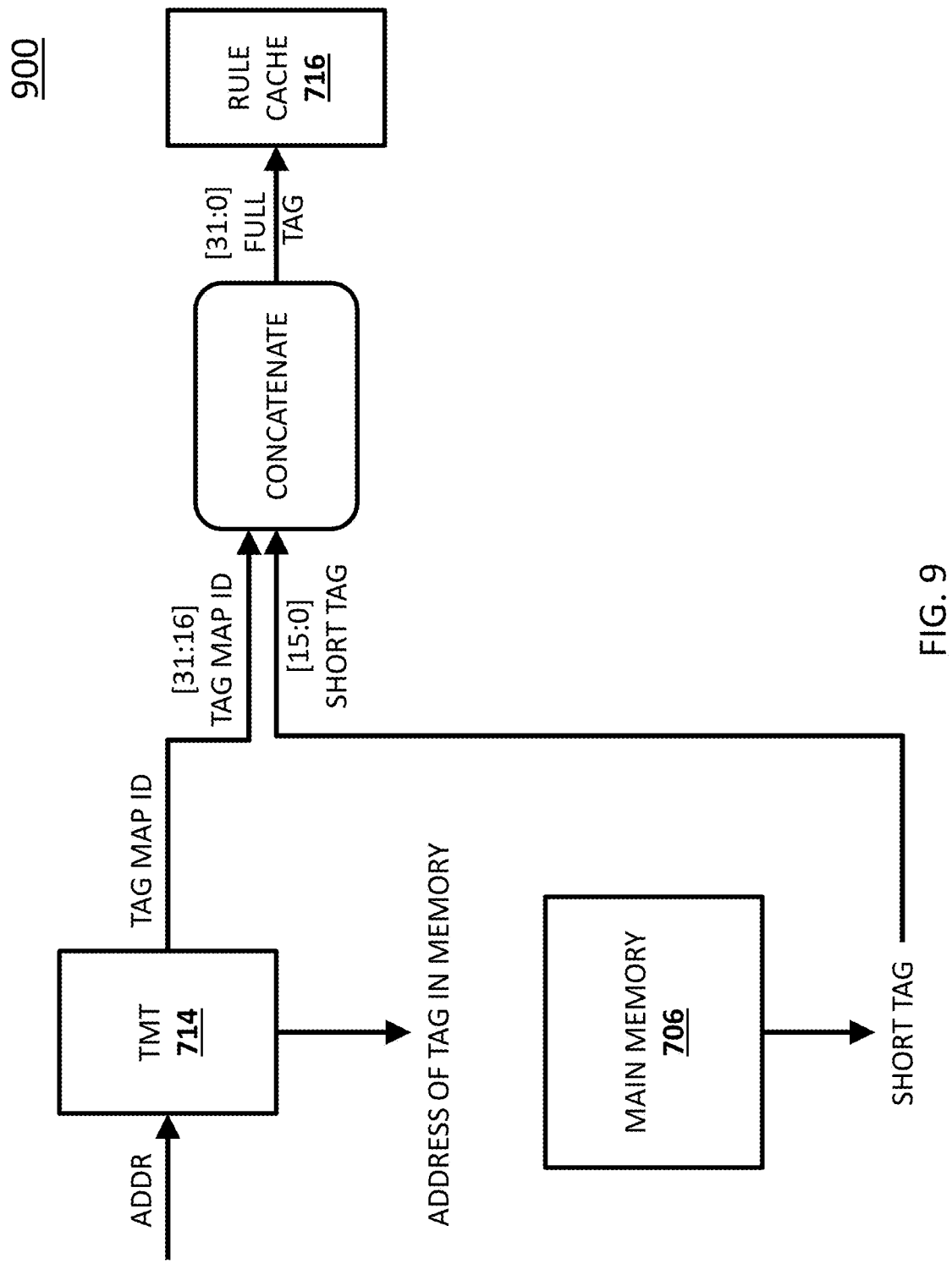
FIG. 9 is a diagram illustrating an example process for concatenating a tag map identifier (ID) and a short tag to derive a full tag.

FIG. 9 is a diagram illustrating an example process 900 for concatenating a tag map ID and a short tag to derive a full tag. In some embodiments, process 900 may be integrated into PIPE 712 or another entity for deriving a long tag (e.g., a pointer-size value indicating a memory address containing metadata for a payload word) from a short tag (e.g., a smaller than pointer-size value that can identify a memory address using one or more schemes or techniques). In such embodiments, after determining a long tag, a memory address of main memory 706 (e.g., metadata memory 726) corresponding to the long tag may be accessed and metadata may be read and used in enforcing a security policy.

In some embodiments, e.g., to avoid repeating the process, PIPE 712 or another entity may store the long tag or corresponding metadata in a cache for faster subsequent metadata retrieval.

Referring to process 900, an address (e.g., a 64-bit value) of a word in memory (e.g., payload memory 724) may be used to lookup a tag map ID (e.g., a 32-bit value) using TMT 714 and then the tag map ID and the short tag may be concatenated (e.g., 16 of the 32 bits of the tag map ID may be concatenated with all 16 bits of the short tag) to create the metadata tag or full tag. In some embodiments, the full tag can be stored in a cache for future retrieval (e.g., without the need to retrieve a short tag from memory).

It will be appreciated that process 900 is for illustrative purposes and that different and/or additional actions may be used. It will also be appreciated that various actions described herein may occur in a different order or sequence.

Figure 10:
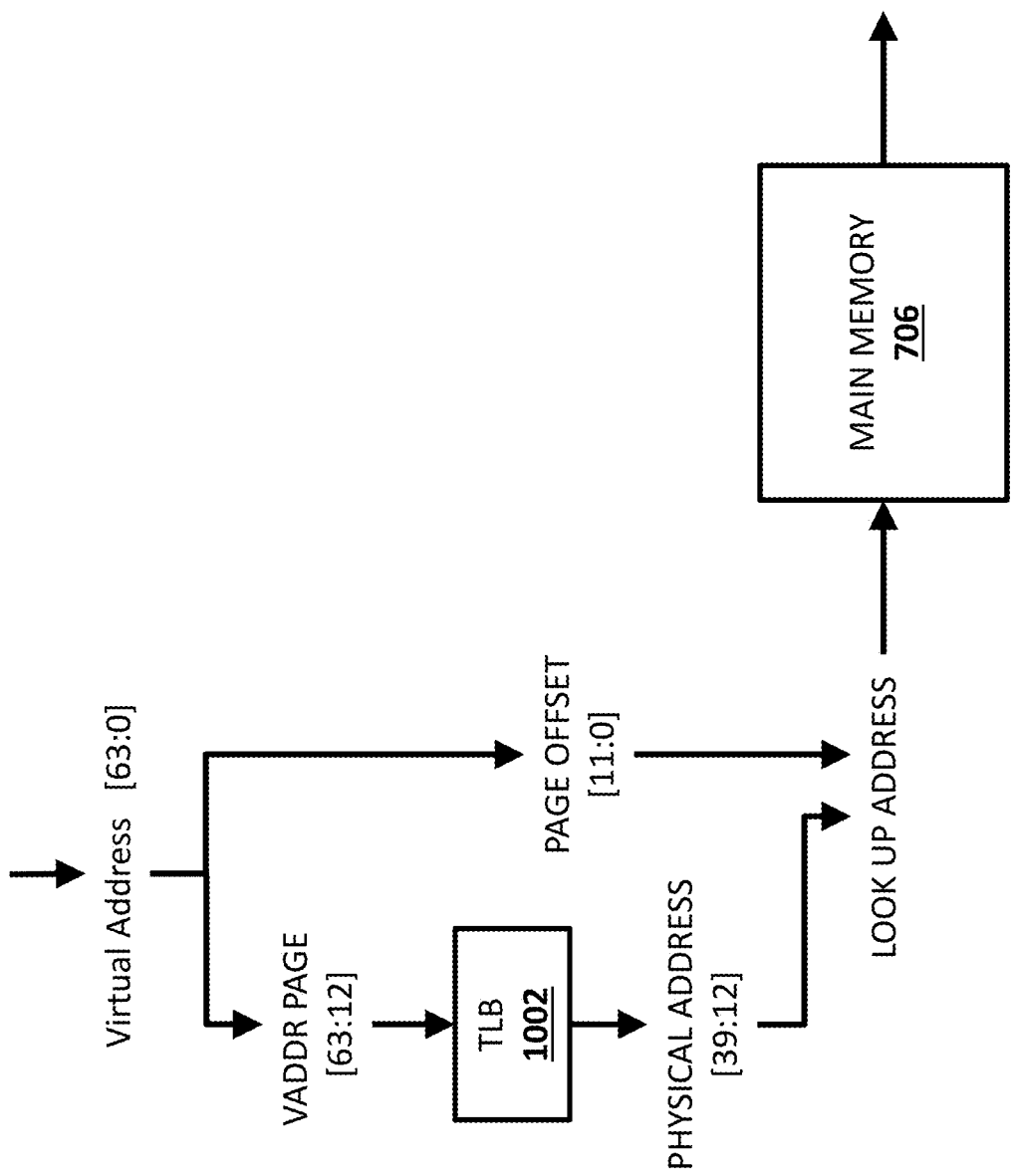
FIG. 10 is a diagram illustrating an example process for using a virtual address and a translation lookaside buffer (TLB) to obtain a main memory physical address.

FIG. 10 is a diagram illustrating an example process 1000 for using a virtual address and a translation lookaside buffer (TLB) 1002 to obtain a main memory physical address. TLB 1002 may represent a memory cache usable for reducing the time taken to access memory locations. In some embodiments, TLB 1002 may reside on-chip (e.g., in a memory management unit) and/or may reside between a CPU (e.g., PU 709) and main memory 706 and/or in other locations.

In some embodiments, TLB 1002 may store mappings between virtual memory addresses and physical memory addresses and may be referred to as an address translation cache. For example, given a virtual memory address of a payload word, a corresponding physical memory address may be found in TLB 1002.

Referring to process 1000, a virtual address (e.g., 64-bit value) of a word in memory (e.g., payload memory 724)

may be used to determine a virtual memory page ID (e.g., 54-bit value) and a page offset value (e.g., a 12-bit value). Using the virtual memory page ID, a physical address (e.g., a 40-bit value) for a physical memory page may be obtained from TLB 1002. In some embodiments, a portion of the physical address (e.g., 28 of 40 bits of the physical address) and the page offset value may be utilized to create a lookup address (e.g., a 40-bit value) for obtaining data from main memory 706.

It will be appreciated that process 1000 is for illustrative purposes and that different and/or additional actions may be used. It will also be appreciated that various virtual memory address mapping hardware (including hardware and configurations different than those discussed herein) can be utilized to perform one or more aspects described herein, e.g., various main memory tag compression schemes and/or techniques. It will also be appreciated that various actions described herein may occur in a different order or sequence.

Figure 11:
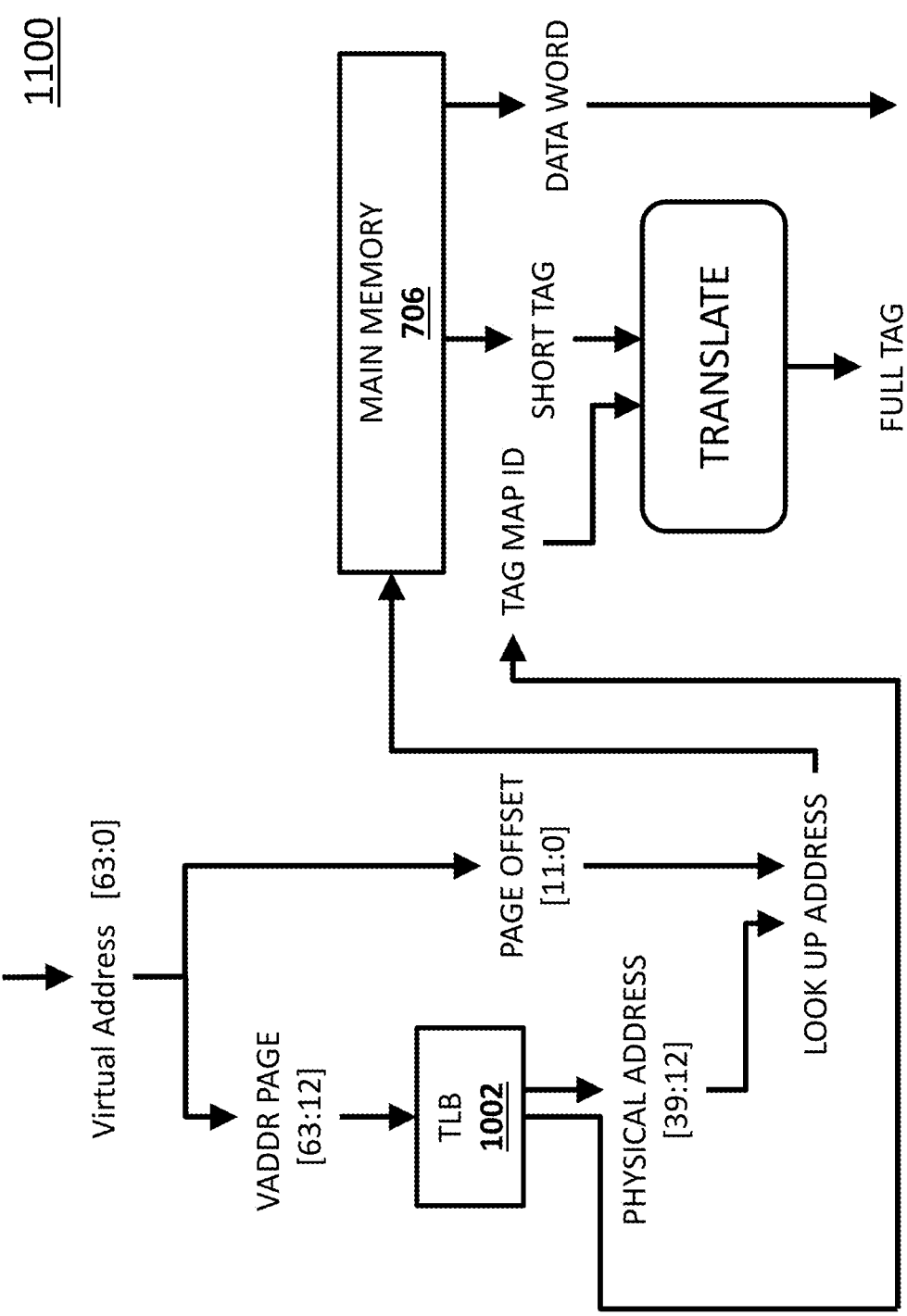
FIG. 11 is a diagram illustrating an example process for translating a short tag and a tag map ID from a TLB to derive a full tag.

FIG. 11 is a diagram illustrating an example process 1100 for translating a short tag and a tag map ID from a TLB to derive a full tag. In some embodiments, process 1100 may utilize an augmented version of the design depicted in FIG. 10 for supporting main memory tag compression. For example, in addition to storing mappings between virtual memory addresses and physical memory addresses, TLB 1002 may also store mappings between virtual memory page IDs and tag map IDs. For example, given a virtual memory page ID, a corresponding physical memory address and a tag map ID may be found in TLB 1002.

In some embodiments, process 1100 may be usable by PEX core 710 or another entity (e.g., PU 711) for deriving a long tag (e.g., a pointer-size value indicating a memory address containing metadata for a payload word) using a virtual address and TLB 1002. In such embodiments, after determining a long tag, a memory address of main memory 706 (e.g., metadata memory 726) corresponding to the long tag may be accessed and metadata may be read and used in enforcing a security policy.

In some embodiments, e.g., to avoid repeating the process, PIPE 712 or another entity may store the long tag or corresponding metadata a cache for faster subsequent metadata retrieval.

Referring to process 1100, a virtual address (e.g., 64-bit value) of a word in memory (e.g., payload memory 724) may be used to determine a virtual memory page ID (e.g., 54-bit value) and a page offset value (e.g., a 12-bit value). Using the virtual memory page ID, a tag map ID (e.g., a 32-bit value) and a physical address (e.g., a 40-bit value) for a physical memory page may be obtained from TLB 1002. In some embodiments, a portion of the physical address (e.g., 28 of 40 bits of the physical address) and the page offset value may be utilized to create a lookup address (e.g., a 40-bit value) for obtaining a short tag. The tag map ID from TLB 1002 and the short tag may then be translated (e.g., via various algorithms or techniques) to create a full tag. After the full tag is created, a payload word from main memory 706 and the full tag may be returned for processing (e.g., to PEX core 710). In some embodiments, the full tag or related data can be stored in a cache for future retrieval.

It will be appreciated that process 1100 is for illustrative purposes and that different and/or additional actions may be used. It will also be appreciated that various actions described herein may occur in a different order or sequence.

Figure 12:
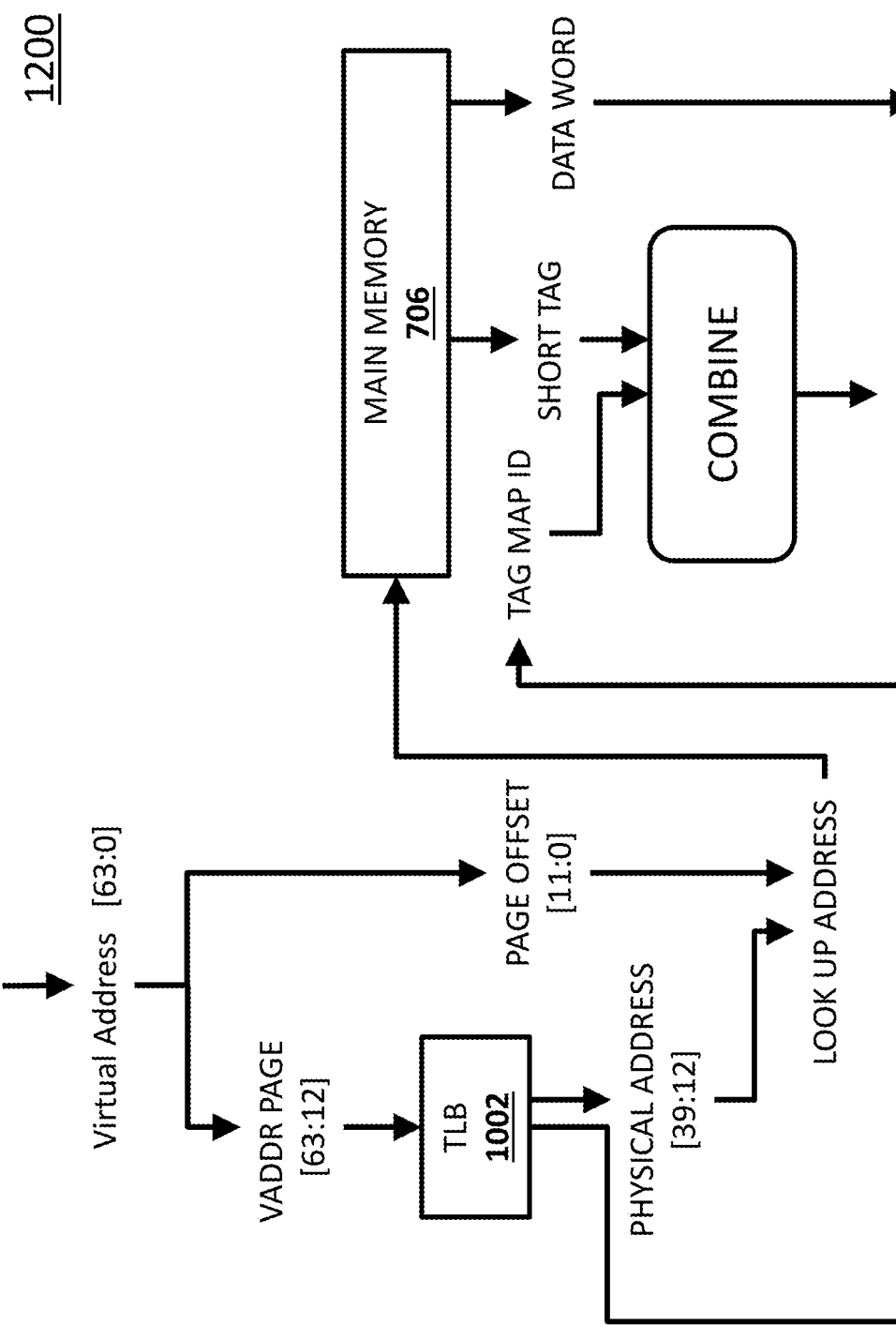
FIG. 12 is a diagram illustrating an example process for combining a short tag and a tag map identifier ID from a TLB to derive a full tag.

FIG. 12 is a diagram illustrating an example process 1200 for combining a short tag and a tag map identifier ID from a TLB to derive a full tag. In some embodiments, in addition to storing mappings between virtual memory addresses and physical memory addresses, TLB 1002 may also store mappings between virtual memory page IDs and tag map IDs. For example, given a virtual memory page ID, a corresponding physical memory address and a tag map ID may be found in TLB 1002.

In some embodiments, process 1200 may be usable by PEX core 710 or another entity (e.g., PU 711) for deriving a long tag (e.g., a pointer-size value indicating a memory address containing metadata for a payload word) using a virtual address and TLB 1002. In such embodiments, after determining a long tag, a memory address of main memory 706 (e.g., metadata memory 726) corresponding to the long tag may be accessed and metadata may be read and used in enforcing a security policy.

In some embodiments, e.g., to avoid repeating the process, PIPE 712 or another entity may store the long tag or corresponding metadata in a cache for faster subsequent metadata retrieval.

Referring to process 1200, a virtual address (e.g., 64-bit value) of a word in memory (e.g., payload memory 724) may be used to determine a virtual memory page ID (e.g., 54-bit value) and a page offset value (e.g., a 12-bit value). Using the virtual memory page ID, a tag map ID and a physical address (e.g., a 28-bit value) for a physical memory page may be obtained from TLB 1002. In some embodiments, a portion of the physical address (e.g., 28 of 40 bits of the physical address) and the page offset value may be utilized to create a lookup address (e.g., a 40-bit value) for obtaining a short tag. The tag map ID from TLB 1002 and the short tag may then be logically combined (e.g., via various algorithms or techniques) to create a full tag. After the full tag is created, a payload word from main memory 706 and the full tag may be returned for processing (e.g., to PEX core 710). In some embodiments, the full tag or related data can be stored in a cache for future retrieval.

It will be appreciated that process 1200 is for illustrative purposes and that different and/or additional actions may be used. It will also be appreciated that various actions described herein may occur in a different order or sequence.

Figure 13:
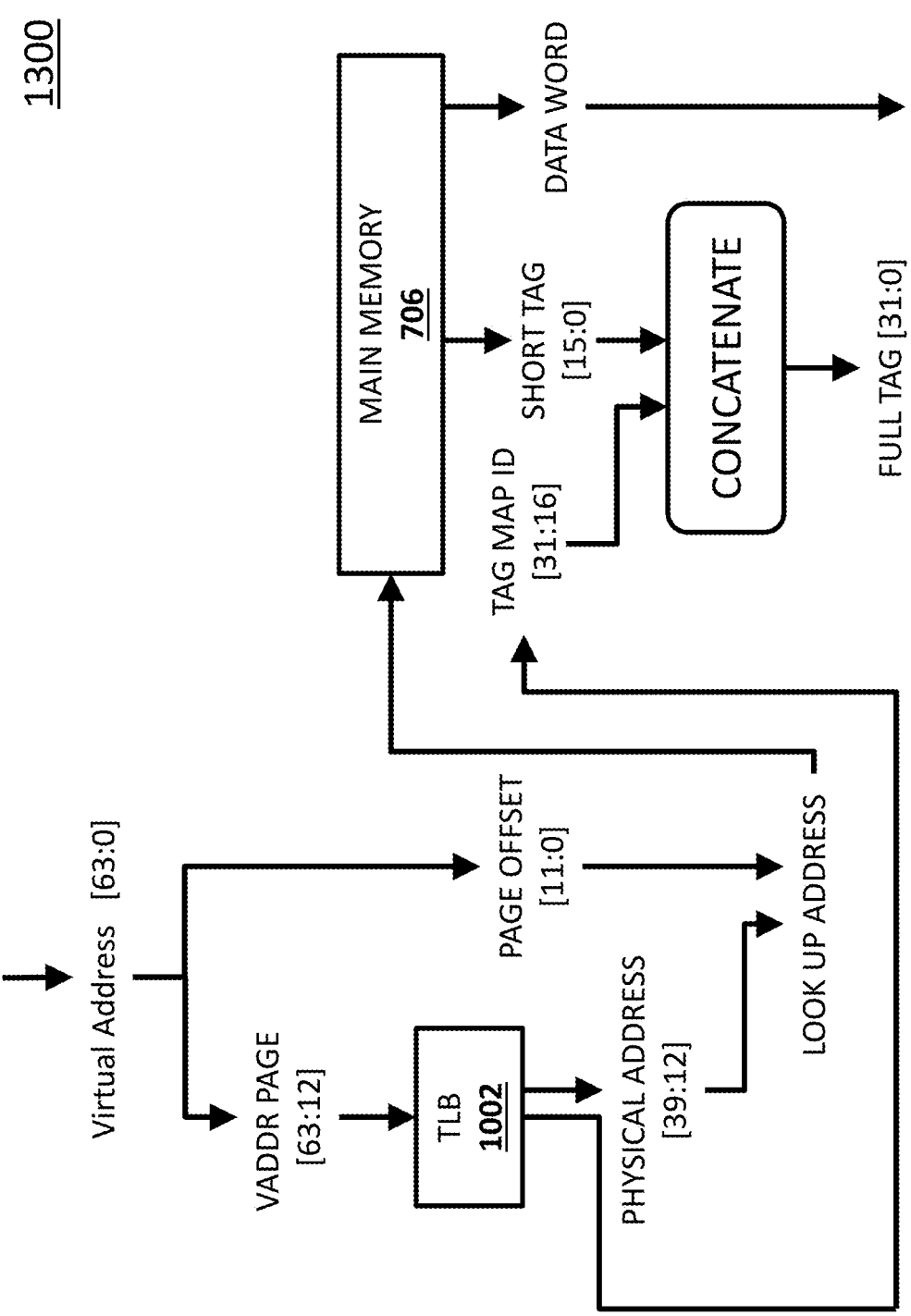
FIG. 13 is a diagram illustrating an example process for concatenating a short tag and a tag map identifier ID from a TLB to derive a full tag.

FIG. 13 is a diagram illustrating an example process 1300 for concatenating a short tag and a tag map identifier ID from a TLB to derive a full tag. In some embodiments, in addition to storing mappings between virtual memory addresses and physical memory addresses, TLB 1002 may also store mappings between virtual memory page IDs and tag map IDs. For example, given a virtual memory page ID, a corresponding physical memory address and a tag map ID may be found in TLB 1002.

In some embodiments, process 1300 may be usable by PEX core 710 or another entity (e.g., PU 711) for deriving a long tag (e.g., a pointer-size value indicating a memory address containing metadata for a payload word) using a virtual address and TLB 1002. In such embodiments, after determining a long tag, a memory address of main memory 706 (e.g., metadata memory 726) corresponding to the long tag may be accessed and metadata may be read and used in enforcing a security policy.

In some embodiments, e.g., to avoid repeating the process, PIPE 712 or another entity may store the long tag or corresponding metadata in a cache for faster subsequent metadata retrieval.

Referring to process 1300, a virtual address (e.g., 64-bit value) of a word in memory (e.g., payload memory 724) may be used to determine a virtual memory page ID (e.g., 54-bit value) and a page offset value (e.g., a 12-bit value). Using the virtual memory page ID, a tag map ID (e.g., a 32-bit value) and a physical address (e.g., a 40-bit value) for a physical memory page may be obtained from TLB 1002. In some embodiments, a portion of the physical address (e.g., 28 of 40 bits of the physical address) and the page offset value may be utilized to create a lookup address (e.g., a 40-bit value) for obtaining a short tag. The tag map ID from TLB 1002 and the short tag may be concatenated (e.g., 16 of the 32 bits of the tag map ID may be concatenated with all 16 bits of the short tag to create the metadata tag or full tag. After the full tag is created, a payload word from main memory 706 and the full tag may be returned for processing (e.g., to PEX core 710). In some embodiments, the full tag or related data can be stored in a cache for future retrieval.

It will be appreciated that process 1300 is for illustrative purposes and that different and/or additional actions may be used. It will also be appreciated that various actions described herein may occur in a different order or sequence.

Figure 14:
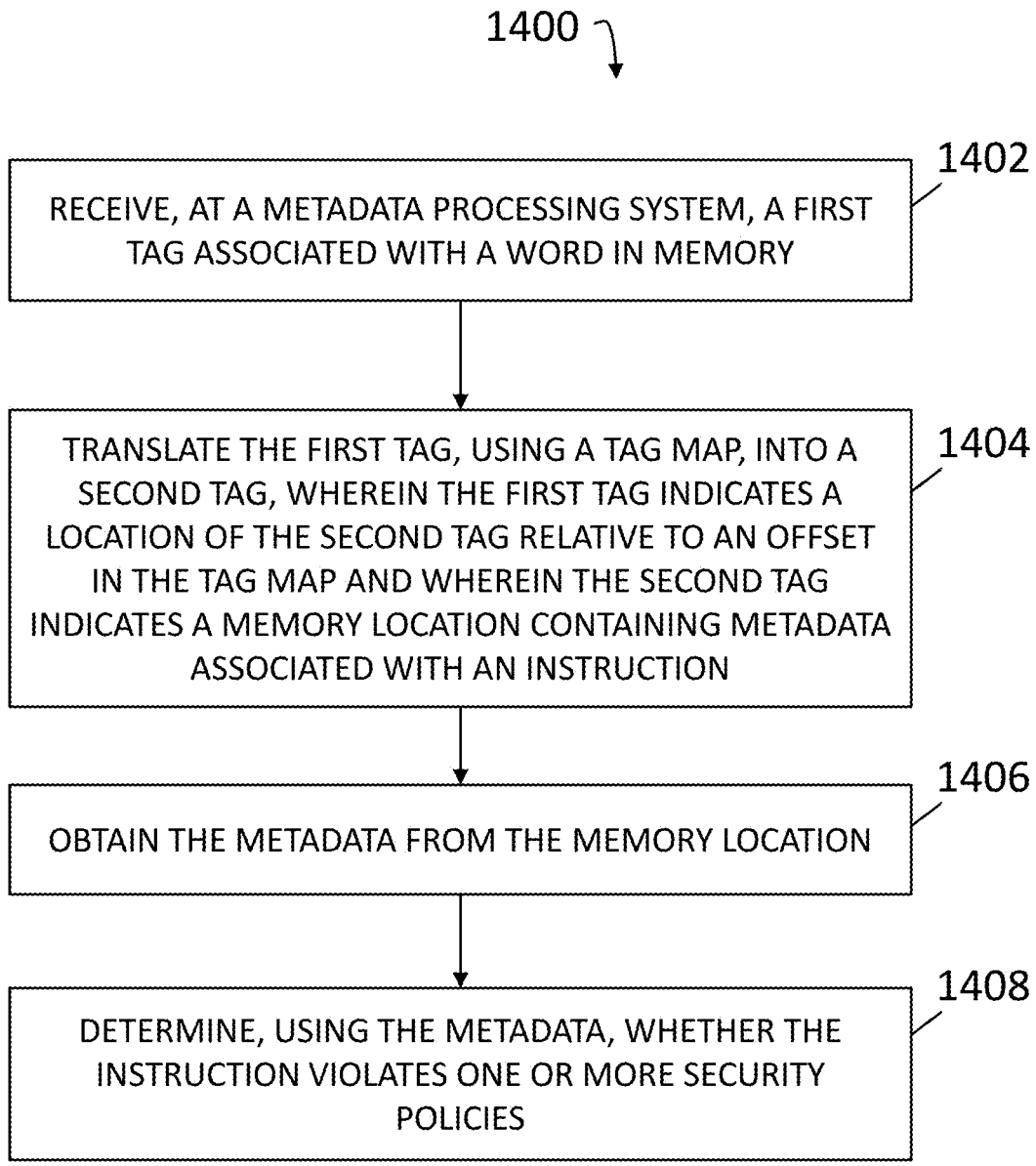
FIG. 14 is a flowchart illustrating an example method for using main memory tag compression.

FIG. 14 is a flowchart of an example method 1400 for using main memory tag compression. Method 1400 or portions thereof (e.g., steps 1402, 1404, 1406, and/or 1408) can be performed, for example, by tagged processor node 702 or by another metadata processing system or related elements for enforcing security policies in a processor architecture (e.g., RISC-V) implemented using one or more processors.

In some embodiments, an example metadata processing system for using main memory tag compression can be software executing on firmware and/or hardware, e.g., a processor, a microprocessor, a central processing unit, or a system on a chip. One such example metadata processing system is shown in FIGS. 4-5 and discussed in various sections herein. In some examples, an example metadata processing system for enforcing security policies in a processor architecture may utilize an SDMP model and/or a PUMP system.

Referring to method 1400, in step 1402, a first tag associated with a word in memory (e.g., main memory 706) may be received at a metadata processing system. For example, a processor instruction (e.g., a RISC-V instruction) may be associated with multiple inputs, including one or more short tags for locating related metadata. In this example, the metadata processing system may receive and use the short tag to obtain relevant metadata for processing and determine whether the related instruction should be allowed (e.g., if it meets relevant security policies).

In step 1404, the first tag may be translated, using a tag map (e.g., TMT 714), into a second tag, wherein the first tag indicates a location of the second tag relative to an offset in the tag map and wherein the second tag indicates a memory location containing metadata associated with an instruction. Tag maps may be data structures for storing and/or organizing tags (e.g., short tags) or related information.

In some embodiments, different memory regions (e.g. pages) can be encoded in different tag maps or tag spaces. For example, instructions stored in one virtual memory page or memory region may be associated with a first tag map, while instructions stored in a different virtual memory page or memory region may be associated with a second tag map.

In some embodiments, different memory regions may share a tag map or short tags therein. For example, a shared tag map may be used when two or more memory regions are associated with the same or similar set of short tags.

In some embodiments, heavily used (e.g., frequently used) short tags may be stored in a global tag map, while less heavily used short tags may be stored in a local tag map. For example, a global tag map may be stored in faster memory (e.g., high-speed SRAM) relative to a local tag map.

In some embodiments, translating a short tag may involve using or accessing one or more tag maps. For example, a tag map may be a physical memory page-based map, a virtual memory page-based map, a shared tag map, a global map, or a local map.

In some embodiments, without performing a lookup in a tag map, a long tag can be created from a short tag and the address of the memory word. In such embodiments, the address of a word in memory may be used to identify a tag map identifier, and then the tag map identifier and the short tag may be combined logically to create the metadata tag. For example, one way of combining the tag map identifier and the short tag is to concatenate them together. In some examples, other techniques (e.g., additions and/or other logical operations) for combining the tag map identifier and the short tag may be used. One example technique for forming the mapping between the word address and the tag map identifier is to store the mapping associated with the virtual to physical page translation for the address in a TLB or similar structure.

In some embodiments, if a first tag is a global tag, then no translation or less translation may be required. For example, if the metadata processing system determines a first tag is global, then a tag map lookup may be avoided, and the first tag may be used as the second tag, e.g., to indicate a memory location containing metadata associated with a word or related instruction.

In some embodiments, a metadata processing system (e.g., tagged processor node 702) may use a software-based policy handler to support tag translation on a memory write. For example, the software-based policy handler identifies the tag map after attempting to use a different tag map during the memory write and failing.

In step 1406, the metadata may be obtained from the memory location. For example, after translating a short tag into a long tag, the metadata processing system may read metadata stored in memory identified by the long tag. In some embodiments, the metadata may be one of five different metadata inputs that come from five different inputs to the instruction. For example, assuming a read or write instruction or operation, one input may be the instruction being performed, one input may be the memory word being read or written, one input may be from the program counter, and two inputs may be from registers involved in the operation.

In some embodiments, multiple tag expansions may be associated with a single instruction. For example, values in the program counter and registers may already have long tags. However, a load or store operation may also involve both an instruction (which is being read from memory) and a memory location being loaded or stored. As such, there may be two memory references being translated. Modern processors typically have separate instruction and data caches that can be read concurrently, so the two reads can still be performed in a single cycle. Furthermore, instructions often have high locality, so such instructions are very likely to hit in the instruction cache. Moreover, it may be very useful to perform this translation before the values are stored into caches to avoid translating multiple short memory tags in a single cycle.

In step 1408, it may be determined, using the metadata, whether the instruction violates a security policy. For example, the metadata processing system may consult or access one or more rule caches to determine whether a rule associated with the metadata is stored. In this example, if the rule is present, the metadata processing system may determine that the instruction satisfies relevant security policy. If the rule is not present in the rule caches, the metadata processing system or related software (e.g., a cache miss handler) may use the metadata to determine whether the instruction satisfies relevant security policy.

In some embodiments, a first tag may be generated based on a second tag or related metadata. For example, generating a short tag may include canonicalizing a long tag into a standard format, determining the tag map to use in generating the short tag, and determining the offset in the tag map to store the long tag.

It will be appreciated that method 1400 is for illustrative purposes and that different and/or additional actions may be used. It will also be appreciated that various actions described herein may occur in a different order or sequence.

Figure 15:
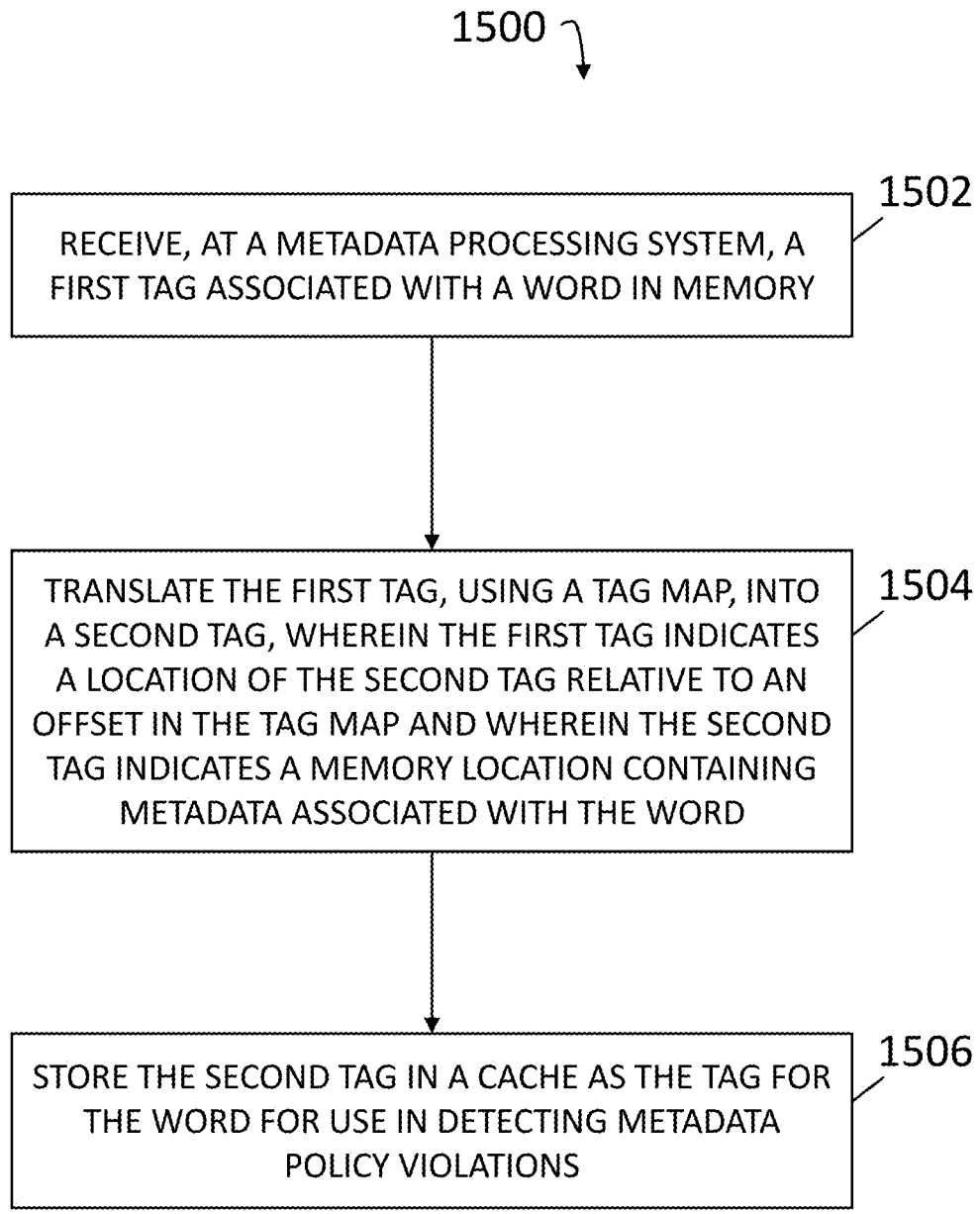
FIG. 15 is a flowchart of another example method for using main memory tag compression.

FIG. 15 is a flowchart of another example method 1500 for using main memory tag compression. Method 1500 or portions thereof (e.g., steps 1502, 1504 and/or 1506) can be performed, for example, by tagged processor node 702 or by another metadata processing system or related elements for enforcing security policies in a processor architecture (e.g., RISC-V) implemented using one or more processors.

Referring to method 1500, in step 1502, a first tag associated with a word in memory (e.g., main memory 706) may be received at a metadata processing system. In some examples, a data cache, an instruction cache, or a memory controller in a metadata processing system may receive and/or use metadata tags. In some examples, when using instruction or data caches in the metadata processing system, when tags are needed for an instruction or a word addressed by an instruction, these tags may be retrieved from the appropriate caches and presented to the metadata processing system for processing to determine whether the associated instruction should be allowed (e.g., whether it meets the relevant security policies).

In some embodiments, a processor instruction (e.g., a RISC-V instruction) may be associated with multiple inputs, including one or more tags for locating related metadata. In this example, the metadata processing system may receive and use tags to obtain relevant metadata for processing and to determine whether the related instruction should be allowed (e.g., whether it meets relevant security policies).

In step 1504, the first tag may be translated, using a tag map (e.g., TMT 714), into a second tag, wherein the first tag indicates a location of the second tag relative to an offset in the tag map and wherein the second tag indicates a memory location containing metadata associated with the word.

In step 1506, the second tag may be stored in a cache as the tag for the word for use in detecting metadata policy violations. For example, the metadata processing system may store multiple tags in one or more data caches. In some embodiments, e.g., where a tag is kept atomically with a word in the instruction (data) cache, method 1500 may store a second tag with the word in the instruction (data) cache. In other embodiments, e.g., where tags for words in memory are stored separately in dedicated tag caches, method 1500 may store a second tag in the dedicated tag cache instead of the first tag read from main memory 706.

It will be appreciated that method 1500 is for illustrative purposes and that different and/or additional actions may be used. It will also be appreciated that various actions described herein may occur in a different order or sequence.

Figure 16:
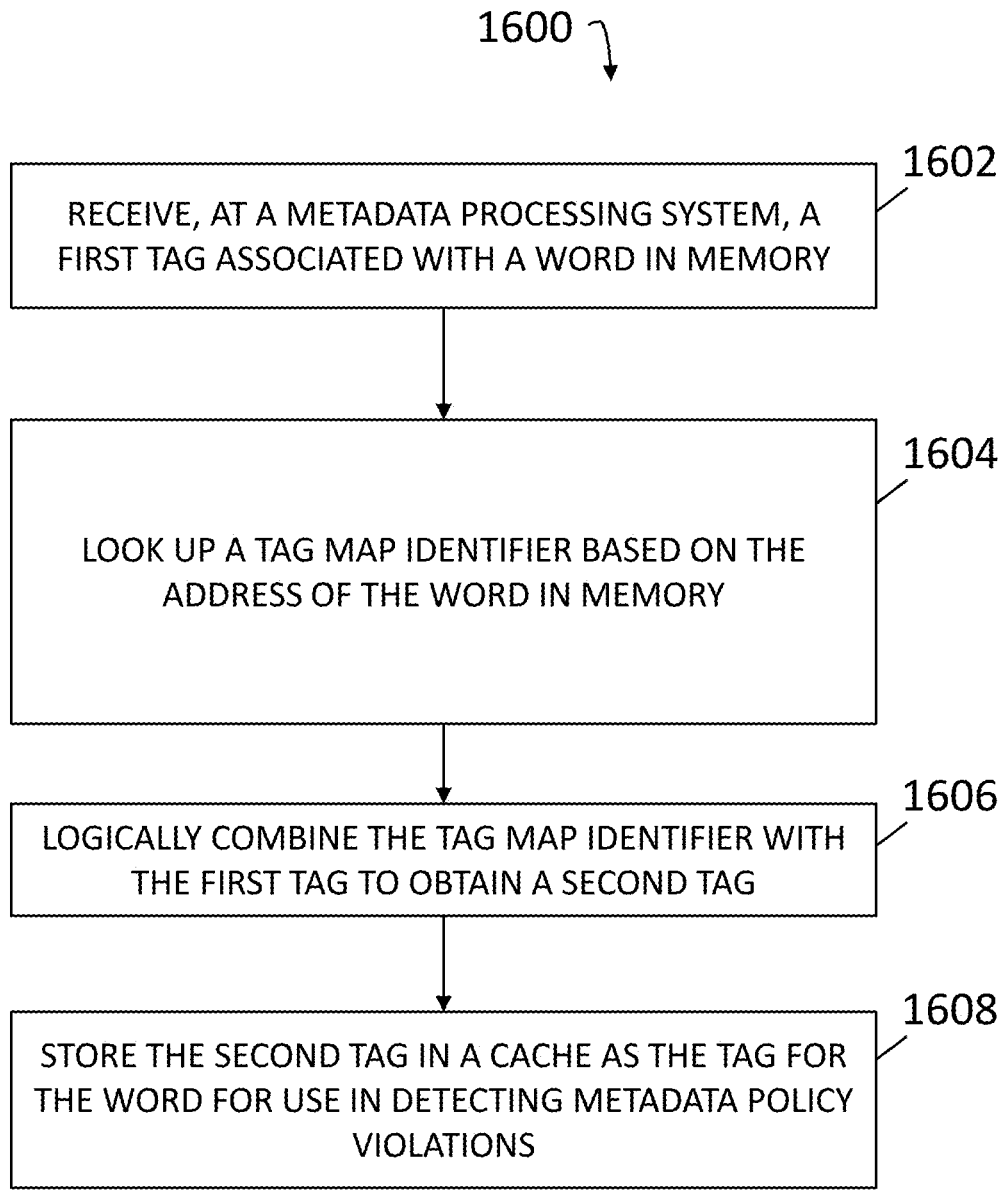
FIG. 16 is a flowchart of another example method for using main memory tag compression.

FIG. 16 is a flowchart of another example method 1600 for using main memory tag compression. Method 1600 or portions thereof (e.g., steps 1602, 1604, 1606, and/or 1608) can be performed, for example, by tagged processor node 702 or by another metadata processing system or related elements for enforcing security policies in a processor architecture (e.g., RISC-V) implemented using one or more processors.

Referring to method 1600, in step 1602, a first tag associated with a word in memory (e.g., main memory 706) may be received at a metadata processing system. In some examples, a data cache, an instruction cache, or a memory controller in a metadata processing system may receive and/or use metadata tags. In some examples, when using instruction or data caches in the metadata processing system, when tags are needed for an instruction or a word addressed by an instruction, these tags may be retrieved from the appropriate caches and presented to the metadata processing system for processing to determine whether the associated instruction should be allowed (e.g., whether it meets the relevant security policies).

In some embodiments, a processor instruction (e.g., a RISC-V instruction) may be associated with multiple inputs, including one or more tags for locating related metadata. In this example, the metadata processing system may receive and use the tags to obtain relevant metadata for processing and to determine whether the related instruction should be allowed (e.g., whether it meets relevant security policies).

In step 1604, a tag map identifier based on the address of the word in memory may be looked up. For example, a metadata processing system may utilize an index or other lookup structure (e.g., TLB) containing associations between memory addresses and tag map identifiers. In this example, the metadata processing system can use the lookup structure such that a memory address can uniquely identify a relevant tag map identifier.

In step 1606, the tag map identifier may be logically combined with the first tag to obtain a second tag. For example, a tag map identifier and a short tag may be concatenated together. In another example, other techniques (e.g., additions and/or other logical operations) may be used for combining a tag map identifier and a short tag.

In step 1608, the second tag may be stored in a cache as the tag for the word for use in detecting metadata policy violations. For example, the metadata processing system may store multiple tags in one or more data caches. In some embodiments, e.g., where a tag is kept atomically with a word in the instruction (data) cache, method 1600 may store a second tag with the word in the instruction (data) cache. In other embodiments, e.g., where tags for words in memory are stored separately in dedicated tag caches, method 1600 may store a second tag in the dedicated tag cache instead of the first tag read from main memory 706.

It will be appreciated that method 1600 is for illustrative purposes and that different and/or additional actions may be used. It will also be appreciated that various actions described herein may occur in a different order or sequence.

Figure 17:
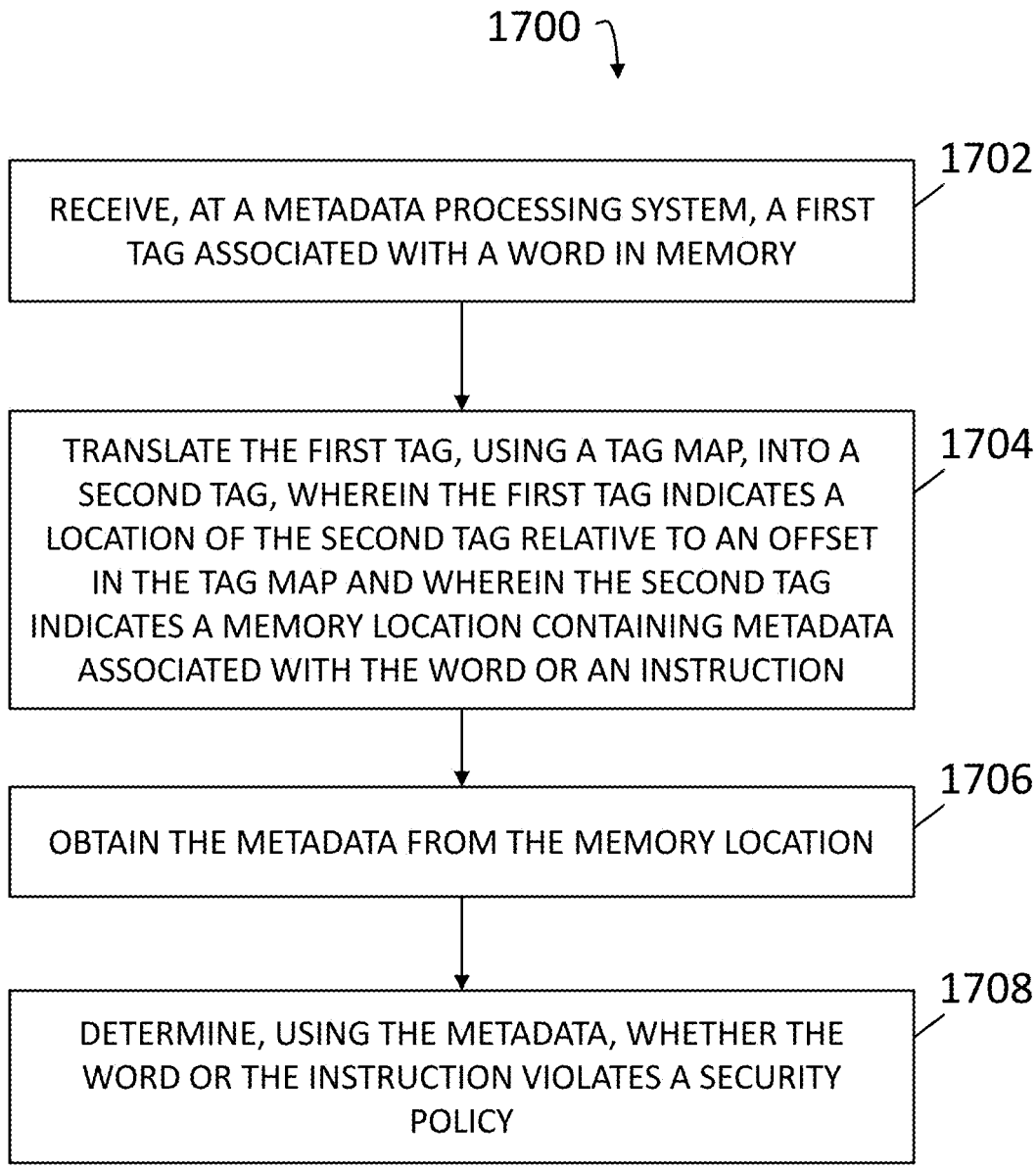
FIG. 17 is a flowchart of another example method for using main memory tag compression.

FIG. 17 is a flowchart of another example method 1700 for using main memory tag compression. Method 1700 or portions thereof (e.g., steps 1702, 1704, 1706, and/or 1708) can be performed, for example, by tagged processor node 702 or by another metadata processing system or related elements for enforcing security policies in a processor architecture (e.g., RISC-V) implemented using one or more processors.

Referring to method 1700, in step 1702, a first tag associated with a word in memory (e.g., main memory 706) may be received at a metadata processing system. In some examples, a data cache, an instruction cache, or a memory controller in a metadata processing system may receive and/or use metadata tags. In some examples, when using instruction or data caches in the metadata processing system, when tags are needed for an instruction or a word addressed by an instruction, these tags may be retrieved from the appropriate caches and presented to the metadata processing system for processing to determine whether the associated instruction should be allowed (e.g., whether it meets the relevant security policies).

In some embodiments, a processor instruction (e.g., a RISC-V instruction) may be associated with multiple inputs, including one or more tags for locating related metadata. In this example, the metadata processing system may receive and use the tags to obtain relevant metadata for processing and to determine whether the related instruction should be allowed (e.g., whether it meets relevant security policies).

In step 1704, the first tag may be translated, using a tag map, into a second tag, wherein the first tag indicates a location of the second tag relative to an offset in the tag map and wherein the second tag indicates a memory location containing metadata associated with the word or an instruction. Tag maps may be data structures for storing and/or organizing tags (e.g., short tags) or related information.

In some embodiments, e.g., after translating a first tag into a second tag, a second tag may be stored in a cache (e.g., a last-level cache) used as the tag for the word when determining whether a subsequent security policy violation occurred. For example, e.g., in an embodiment where a tag is kept atomically with a word in the instruction (data) cache, a second tag with the word may be stored in the instruction (data) cache. In this example, since the instruction (data) cache already has the second tag, a translation into the second tag can be avoided when determining whether a subsequent security policy violation occurred. In another example, e.g., in an embodiment where tags for words in memory are stored separately in dedicated tag caches, a second tag may be in the dedicated tag cache instead of the first tag read from main memory 706, e.g., when the same instruction is executed again. In this example, since the dedicated tag cache already has the second tag, a translation into the second tag can be avoided when determining whether a subsequent security policy violation occurred, e.g., when the same instruction is executed again.

In some embodiments, different memory regions (e.g. pages) can be encoded in different tag maps or tag spaces. For example, instructions stored in one virtual memory page or memory region may be associated with a first tag map, while instructions stored in a different virtual memory page or memory region may be associated with a second tag map.

In some embodiments, different memory regions may share a tag map or short tags therein. For example, a shared tag map may be used when two or more memory regions are associated with the same or similar set of short tags.

In some embodiments, heavily used (e.g., frequently used) short tags may be stored in a global tag map, while less heavily used short tags may be stored in a local tag map. For example, a global tag map may be stored in faster memory (e.g., high-speed SRAM) relative to a local tag map.

In some embodiments, translating the short tag may involve using or accessing one or more tag maps. For example, a tag map may be a physical memory page-based map, a virtual memory page-based map, a shared tag map, a global map, or a local map.

In some embodiments, without performing a lookup in a tag map, a long tag can be created from a short tag and the address of the memory word. In such embodiments, the address of a word in memory may be used to identify a tag map identifier, and then the tag map identifier and the short tag may be combined logically to create the metadata tag.

For example, one way of combining the tag map identifier and the short tag is to concatenate them together. In some examples, other techniques (e.g., additions and/or other logical operations) for combining the tag map identifier and the short tag may be used. One example technique for forming the mapping between the word address and the tag map identifier is to store the mapping associated with the virtual to physical page translation for the address in a translation lookaside buffer (TLB) or similar structure.

In some embodiments, if a first tag is a global tag, then no translation or less translation may be required. For example, if the metadata processing system determines a first tag is global, then a tag map lookup may be avoided, and the first tag may be used as the second tag, e.g., to indicate a memory location containing metadata associated with a word or related instruction.

In some embodiments, a metadata processing system (e.g., tagged processor node 702) may use a software-based policy handler to support tag translation on a memory write. For example, the software-based policy handler identifies the tag map after attempting to use a different tag map during the memory write and failing.

In step 1706, the metadata may be obtained from the memory location. For example, after translating a short tag into a long tag, the metadata processing system may read metadata stored in memory identified by the long tag. In some embodiments, the metadata may be one of five different metadata inputs that come from five different inputs to the instruction. For example, assuming a read or write instruction or operation, one input may be the instruction being performed, one input may be the memory word being read or written, one input may be from the program counter, and two inputs may be from registers involved in the operation.

In some embodiments, multiple tag expansions may be associated with a single instruction. For example, values in the program counter and registers may already have long tags. However, a load or store operation may also involve both an instruction (which is being read from memory) and a memory location being loaded or stored. As such, there may be two memory references being translated. Modern processors typically have separate instruction and data caches that can be read concurrently, so the two reads can still be performed in a single cycle. Furthermore, instructions often have high locality, so such instructions are very likely to hit in the instruction cache. Moreover, it may be very useful to perform this translation before the values are stored into caches to avoid translating multiple short memory tags in a single cycle.

In step 1708, it may be determined, using the metadata, whether the word or the instruction violates a security policy. For example, the metadata processing system may consult or access one or more rule caches to determine whether a rule associated with the metadata is stored. In this example, if the rule is present, the metadata processing system may determine that the instruction satisfies relevant security policy. If the rule is not present in the rule caches, the metadata processing system or related software (e.g., a cache miss handler) may use the metadata to determine whether the instruction satisfies relevant security policy.

In some embodiments, a first tag may be generated based on a second tag or related metadata. For example, generating a short tag may include canonicalizing a long tag into a standard format, determining the tag map to use in generating the short tag, and determining the offset in the tag map to store the long tag.

It will be appreciated that method 1700 is for illustrative purposes and that different and/or additional actions may be used. It will also be appreciated that various actions described herein may occur in a different order or sequence.

It will also be appreciated that each of methods 1400, 1500, 1600, or 1700 can be executed in a distributed manner. For example, a plurality of processors may be configured for performing method 1500 or portions thereof.

REFERENCES

The inline citations herein refer to the references listed below, and the disclosure of each of the following references is incorporated herein by reference in its entirety to the extent not inconsistent herewith and to the extent that it supplements, explains, provides a background for, or teaches methods, techniques, and/or systems employed herein.

[1] J. R. Crandall, F. T. Chong, and S. F. Wu, "Minos: Architectural support for protecting control data," ACM Transactions on Architecture and Code Optimization, vol. 5, pp. 359-389, December 2006.

[2] N. Vachharajani, M. J. Bridges, J. Chang, R. Rangan, G. Ottoni, J. A. Biome, G. A. Reis, M. Vachharajani, and D. I. August, "RIFLE: An architectural framework for user-centric information-flow security," in 37th International Symposium on Microarchitecture, 2004.

[3] S. Chen, J. Xu, N. Nakka, Z. Kalbarczyk, and R. Iyer, "Defeating memory corruption attacks via pointer taintedness detection," in International Conference on Dependable Systems and Networks (DSN), pp. 378-387, 2005.

[4] J. A. Clause, W. Li, and A. Orso, "Dytan: a generic dynamic taint analysis framework," in ACM/SIGSOFT International Symposium on Software Testing and Analysis (ISSTA), pp. 196-206, ACM, 2007.

[5] M. G. Kang, S. McCement, P. Poosankam, and D. Song, "DTA++: Dynamic taint analysis with targeted control-flow propagation," in Network and Distributed System Security Symposium (NDSS), The Internet Society, 2011.

[6] Y.-Y. Chen, P. A. Jamkhedkar, and R. B. Lee, "A software-hardware architecture for self-protecting data," in ACM Conference on Computer and Communications Security, pp. 14-27, ACM, 2012.

[7] G. E. Suh, J. W. Lee, D. Zhang, and S. Devadas, "Secure program execution via dynamic information flow tracking," in International Conference on Architectural Support for Programming Languages and Operating Systems, pp. 85-96, 2004.

[8] G. Venkataramani, B. Roemer, Y. Solihin, and M. Prvulovic, "Memtracker: Efficient and programmable support for memory access monitoring and debugging," in Proceedings of the International Symposium on High Performance Computer Architecture, pp. 273-284, 2007.

[9] M. Abadi, M. Budiu, Ú. Erlingsson, and J. Ligatti, "Control-flow integrity principles, implementations, and applications," ACM Transactions on Information System Security, vol. 13, no. 1, 2009.

[10] N. P. Carter, S. W. Keckler, and W. J. Daily, "Hardware support for fast capability-based addressing," in Proceedings of the international conference on Architectural support for programming languages and operating systems, ASPLOS-VI, pp. 319-327, 1994.

[11] P. Akritidis, M. Costa, M. Castro, and S. Hand, "Baggy bounds checking: an efficient and backwards-compatible defense against out-of-bounds errors," in Proceedings of the 18th Conference on USENIX Security Symposium, pp. 51-66, 2009.

[12] S. Nagarakatte, M. M. K. Martin, and S. Zdancewic, "Hardware-Enforced Comprehensive Memory Safety," IEEE Micro, vol. 33, pp. 38-47, May-June 2013.

[13] K. Ganesh, "Pointer checker: Easily catch out-of-bounds memory access," The Parallel Universe, 2012.

[14] C. Zhang, T. Wei, Z. Chen, L. Duan, L. Szekeres, S. McCement, D. Song, and W. Zou, "Practical Control Flow Integrity & Randomization for Binary Executables," in IEEE Symposium on Security and Privacy, 2013.

[15] R. Prakash, "The holy grail—real time memory access checking." Online https://blogs.oracle.com/rayentry/the_holy_grail_real_time, October 2015.

[16] E. Göktaş, E. Athanasopoulos, H. Bos, and G. Portokalidis, "Out of control: Overcoming control-flow integrity," in IEEE Symposium on Security and Privacy, 2014.

[17] L. Davi, A. Sadeghi, D. Lehmann, and F. Monrose, "Stitching the gadgets: On the ineffectiveness of coarse-grained control-flow integrity protection," in 23rd USENIX Security Symposium, pp. 401-416, 2014.

[18] U. Dhawan, C. Hriţcu, R. Rubin, N. Vasilakis, S. Chiricescu, J. M. Smith, T. F. Knight, Jr., B. C. Pierce, and A. DeHon, "Architectural support for software-defined metadata processing," in International Conference on Architectural Support for Programming Languages and Operating Systems, pp. 487-502, 2015.

[19] I. Heo, M. Kim, Y. Lee, J. Lee, B. B. Kang, and Y. Paek, "Implementing an application specific instruction-set processor for system level dynamic program analysis engines," ACM Transactions on Design Automation of Electronic Systems, vol. 9, p. Article 39, March 2015.

[20] S. Fytraki, E. Vlachos, Y. O. Koçberber, B. Falsafi, and B. Grot, "FADE: A programmable filtering accelerator for instruction-grain monitoring," in 20th IEEE International Symposium on High Performance Computer Architecture, HPCA 2014, Orlando, Fla., USA, February 15-19, 2014, pp. 108-119, 2014.

[21] S. Nagarakatte, J. Zhao, M. M. K. Martin, and S. Zdancewic, "SoftBound: highly compatible and complete spatial memory safety for C," in ACM SIGPLAN Conference on Programming Language Design and Implementation (PLDI), pp. 245-258, ACM, 2009.

[22] D. Arora, S. Ravi, A. Raghunathan, and N. K. Jha, "Architectural support for run-time validation of program data properties," IEEE Transactions on Very Large Scale Integration (VLSI) Systems, vol. 15, pp. 546-559, May 2007.

[23] S. Chen, M. Kozuch, T. Strigkos, B. Falsafi, P. B. Gibbons, T. C. Mowry, V. Ramachandran, O. Ruwase, M. P. Ryan, and E. Vlachos, "Flexible hardware acceleration for instruction-grain program monitoring," in 35th International Symposium on Computer Architecture (ISCA), pp. 377-388, IEEE, 2008.

[24] J. A. Clause, I. Doudalis, A. Orso, and M. Prvulovic, "Effective memory protection using dynamic tainting," in 22nd IEEE/ACM International Conference on Automated Software Engineering (ASE), pp. 284-292, ACM, 2007.

[25] R. Wahbe, S. Lucco, T. E. Anderson, and S. L. Graham, "Efficient software-based fault isolation," in Proceedings of the Symposium on Operating Systems Principles, SOSP, pp. 203-216, 1993.

[26] M. Abadi, M. Budiu, Ú. Erlingsson, and J. Ligatti, "Control-flow integrity," in 12th ACM Conference on Computer and Communications Security, pp. 340-353, ACM, 2005.

[27] D. A. Huffman, "A method for the construction of minimum redundancy codes," Proceedings of the IRE, vol. 40, pp. 1098-1101, 1952.

[28] G. T. Sullivan, et al., "The Dover Inherently Secure Processor", Proceedings of the 2017 IEEE International Symposium on Technologies for Homeland Security (HST), Waltham, Mass., 2017, pp. 1-5, doi: 10.1109/THS.2017.7943502.

Although specific examples and features have been described above, these examples and features are not intended to limit the scope of the present disclosure, even where only a single example is described with respect to a feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed in this specification (either explicitly or implicitly), or any generalization of features disclosed, whether or not such features or generalizations mitigate any or all of the problems described in this specification. Accordingly, new claims may be formulated during prosecution of this application (or an application claiming priority to this application) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for using metadata tag compression, the method comprising:
   at a metadata processing system for enforcing security policies in a processor architecture implemented on one or more processors of a chip and utilizing an off-chip main memory for storing tags and related metadata:
   performing metadata tag compression including generating a first tag based on a second tag and storing the first tag in the main memory, wherein generating the first tag includes canonicalizing the first tag to generate a standardized first tag;
   receiving, at the metadata processing system, the first tag associated with a word in memory, wherein the bit size of the first tag is less than the bit size of a memory pointer for indicating a memory location containing metadata associated with the word or an instruction associated with the word;
   translating the first tag, using a tag map, into the second tag, wherein the first tag indicates a location of the second tag relative to an offset in the tag map and wherein the second tag indicates the memory location containing the metadata associated with the word or the instruction;
   obtaining the metadata from the memory location;
   determining, using the metadata, whether the word or the instruction violates a security policy; and
   in response to the determining, performing a security policy enforcement action, wherein the security policy enforcement action includes allowing the instruction or an operation associated with the word to be executed by an application or preventing the instruction or the operation associated with the word from being executed by the application.

2. The method of claim 1, wherein generating the first tag includes:
   canonicalizing the second tag into a standard format;
   determining the tag map to use in generating the first tag; and
   determining the offset in the tag map to store the second tag.

3. The method of claim 1, wherein the tag map is a physical memory page-based map, a virtual memory page-based map, a shared tag map, a global map, or a local map.

4. The method of claim 1, wherein the address of the word in memory is used to identify the tag map from a plurality of tag maps; or
   wherein the second tag is stored in a cache and used as the tag for the word when determining a subsequent security policy violation.

5. The method of claim 4, wherein translating the first tag into the second tag includes performing a logical operation using tag map identifiers and the first tag, wherein the logical operation includes addition or concatenation.

6. The method of claim 1, wherein the metadata processing system uses a software-based policy handler to support tag translation on a memory write.

7. The method of claim 6, wherein the software-based policy handler identifies the tag map after attempting to use a different tag map during the memory write and failing.

8. A system for using metadata tag compression, the system comprising:
   one or more processors of a chip; and
   a metadata processing system for enforcing security policies in a processor architecture implemented on the one or more processors of the chip and utilizing an off-chip main memory for storing tags and related metadata and configured to perform operations comprising:
   performing metadata tag compression including generating a first tag based on a second tag and storing the first tag in the main memory, wherein generating the first tag includes canonicalizing the first tag to generate a standardized first tag;
   receiving, at the metadata processing system, the first tag associated with a word in memory, wherein the bit size of the first tag is less than the bit size of a memory pointer for indicating a memory location containing metadata associated with the word or an instruction associated with the word;
   translating the first tag, using a tag map, into the second tag, wherein the first tag indicates a location of the second tag relative to an offset in the tag map and wherein the second tag indicates the memory location containing the metadata associated with the word or the instruction;
   obtaining the metadata from the memory location;
   determining, using the metadata, whether the word or the instruction violates a security policy; and
   in response to the determining, performing a security policy enforcement action, wherein the security policy enforcement action includes allowing the instruction or an operation associated with the word to be executed by an application or preventing the instruction or the operation associated with the word from being executed by the application.

9. The system of claim 8, wherein generating the first tag includes:
   canonicalizing the second tag into a standard format;
   determining the tag map to use in generating the first tag; and
   determining the offset in the tag map to store the second tag.

10. The system of claim 8, wherein the tag map is a physical memory page-based map, a virtual memory page-based map, a shared tag map, a global map, or a local map.

11. The system of claim 8, wherein the address of the word in memory is used to identify the tag map from a plurality of tag maps; or
   wherein the second tag is stored in a cache and used as the tag for the word when determining subsequent security policy violations.

12. The system of claim 11, wherein the cache is a last level cache.

13. The system of claim 8, wherein translating the first tag into the second tag includes performing a logical operation using tag map identifiers and the first tag, wherein the logical operation includes addition or concatenation.

14. The system of claim 8, wherein the metadata processing system uses a software-based policy handler to support tag translation on a memory write.

15. The system of claim 14, wherein the software-based policy handler identifies the tag map after attempting to use a different tag map during the memory write and failing.

16. A non-transitory computer readable medium storing executable instructions that when executed by at least one processor of a computer control the computer to perform operations comprising:
   at a metadata processing system for enforcing security policies in a processor architecture implemented on one or more processors of a chip and utilizing an off-chip main memory for storing tags and related metadata:
   performing metadata tag compression including generating a first tag based on a second tag and storing the first tag in the main memory, wherein generating the first tag includes canonicalizing the first tag to generate a standardized first tag;
   receiving, at the metadata processing system, the first tag associated with a word in memory, wherein the bit size of the first tag is less than the bit size of a memory pointer for indicating a memory location containing metadata associated with the word or an instruction associated with the word;
   translating the first tag, using a tag map, into the second tag, wherein the first tag indicates a location of the second tag relative to an offset in the tag map and wherein the second tag indicates the memory location containing the metadata associated with the word or the instruction;
   obtaining the metadata from the memory location;
   determining, using the metadata, whether the word or the instruction violates a security policy; and
   in response to the determining, performing a security policy enforcement action, wherein the security policy enforcement action includes allowing the instruction or an operation associated with the word to be executed by an application or preventing the instruction or the operation associated with the word from being executed by the application.

* * * * *